US012566756B2

(12) United States Patent
Jha et al.

(10) Patent No.: US 12,566,756 B2
(45) Date of Patent: Mar. 3, 2026

(54) EFFICIENT EVENT-TYPE-BASED DISTRIBUTED LOG-ANALYTICS SYSTEM

(71) Applicant: VMware LLC, Palo Alto, CA (US)

(72) Inventors: Ritesh Jha, Bangalore (IN);
Chandrashekhar Jha, Bangalore (IN);
Nikhil Jaiswal, Bangalore (IN); **Jobin
Raju George, Bangalore (IN); Shivam
Satija**, Bangalore (IN)

(73) Assignee: VMware LLC, Palo Alto, CA (US)

( * ) Notice: Subject to any disclaimer, the term of this
patent is extended or adjusted under 35
U.S.C. 154(b) by 1154 days.

(21) Appl. No.: 16/937,708

(22) Filed: Jul. 24, 2020

(65) Prior Publication Data

US 2021/0357397 A1     Nov. 18, 2021

(30) Foreign Application Priority Data

May 15, 2020     (IN) .............................. 202041020556

(51) Int. Cl.
*G06F 16/245*        (2019.01)
*G06F 9/455*         (2018.01)
*G06F 16/9035*       (2019.01)

(52) U.S. Cl.
CPC ........ *G06F 16/245* (2019.01); *G06F 9/45558*
(2013.01); *G06F 16/9035* (2019.01); *G06F
2009/45562* (2013.01)

(58) Field of Classification Search
CPC ........................... G06F 16/245; G06F 16/9035
See application file for complete search history.

(56) References Cited

U.S. PATENT DOCUMENTS

| | | | | |
|---|---|---|---|---|
| 2018/0113783 A1* | 4/2018 | Luo | ..................... | G06F 11/3636 |
| 2018/0341566 A1* | 11/2018 | Harutyunyan | ...... | G06F 11/3495 |
| 2019/0026206 A1* | 1/2019 | Harutyunyan | ...... | G06F 11/0781 |
| 2020/0034345 A1* | 1/2020 | Ikai | ........................ | G06F 16/81 |

* cited by examiner

*Primary Examiner* — James E Richardson
(74) *Attorney, Agent, or Firm* — Quarles & Brady LLP

(57) ABSTRACT

The current document is directed to methods and systems
that efficiently transmit and process log/event messages
within and among distributed computer facilities. By digest-
ing and condensing log/event messages at the message-
collector level, the volume of data transmitted from message
collectors to message-ingestion-and-processing systems is
greatly reduced, which increases system efficiencies by
decreasing network overheads and which provides sufficient
additional computational bandwidth at the message-collec-
tor level to allow message collectors to offload many mes-
sage-processing tasks from message-ingestion-and-process-
ing system and other downstream processing systems. When
the currently disclosed, improved message-collectors carry
out message-processing tasks formerly carried out by mes-
sage-ingestion-and-processing systems and other down-
stream processing systems, an even greater deduction in the
volume of data transmitted from message collectors to
message-ingestion-and-processing systems is obtained, fur-
ther increasing system efficiencies. The decrease in data
volume also contributes to increased message-query-pro-
cessing efficiencies.

19 Claims, 37 Drawing Sheets

EFFICIENT EVENT-TYPE-BASED DISTRIBUTED LOG-ANALYTICS SYSTEM

RELATED APPLICATIONS

Benefit is claimed under 35 U.S.C. 119(a)-(d) to Foreign Application Serial No. 202041020556 filed in India entitled "EFFICIENT EVENT-TYPE-BASED DISTRIBUTED LOG-ANALYTICS SYSTEM", on May 15, 2020, by VMware, Inc., which is herein incorporated in its entirety by reference for all purposes.

TECHNICAL FIELD

The current document is directed to distributed-computer-systems and, in particular, to methods and systems that efficiently transmit and process log/event messages within and among distributed computer facilities.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that efficiently transmit and process log/event messages within and among distributed computer facilities. By digesting and condensing log/event messages at the message-collector level, the volume of data transmitted from message collectors to message-ingestion-and-processing systems is greatly reduced, which increases system efficiencies by decreasing network overheads and which provides sufficient additional computational bandwidth at the message-collector level to allow message collectors to offload many message-processing tasks from message-ingestion-and-processing system and other downstream processing systems. When the currently disclosed, improved message-collectors carry out message-processing tasks formerly carried out by message-ingestion-and-processing systems and other downstream processing systems, an even greater deduction in the volume of data transmitted from message collectors to message-ingestion-and-processing systems is obtained, further increasing system efficiencies. The decrease in data volume also contributes to increased message-query-processing efficiencies.

DETAILED DESCRIPTION

Figure 1:
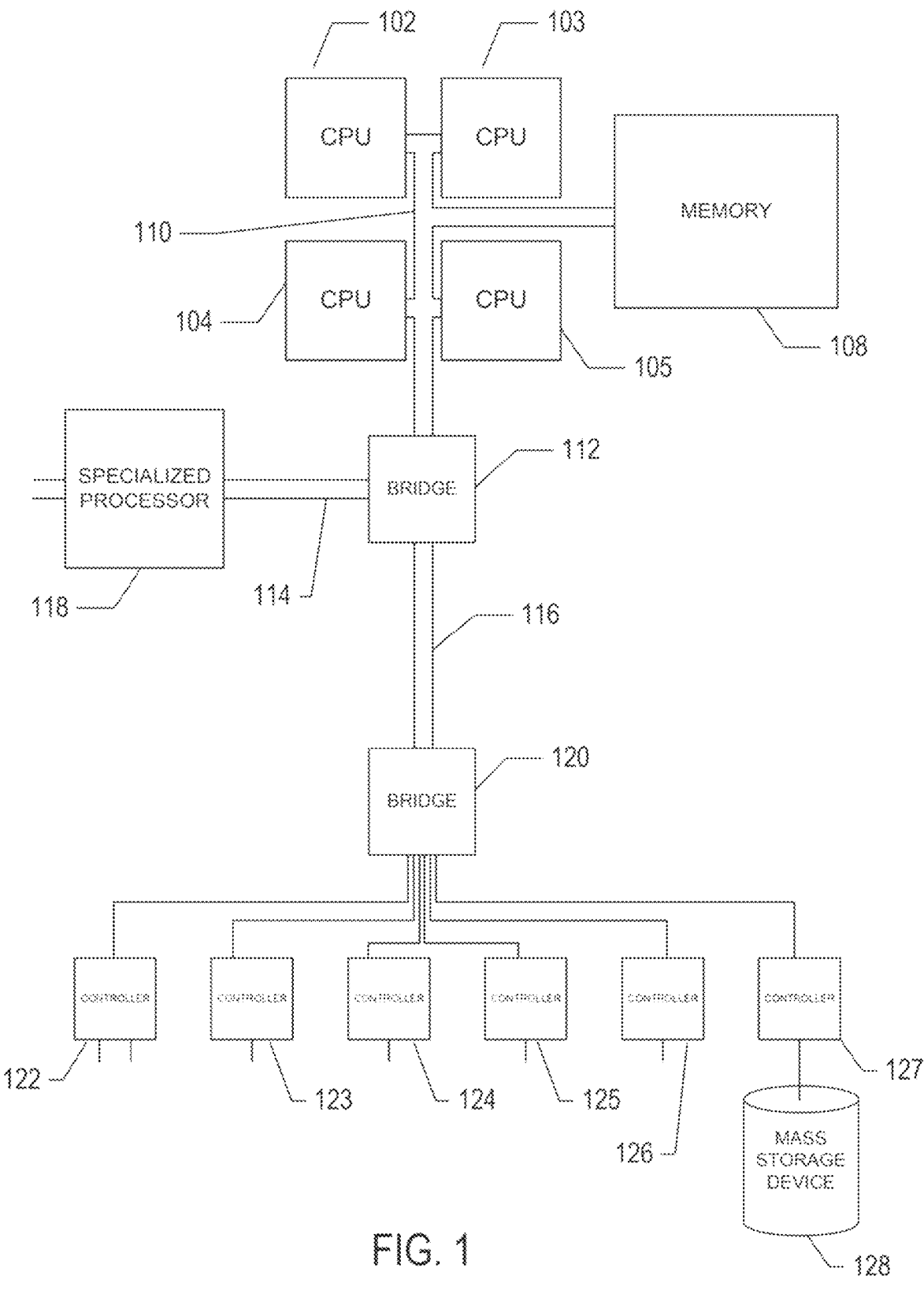
FIG. 1 provides a general architectural diagram for various types of computers.

The current document is directed to methods and systems that that efficiently transmit and process log/event messages within and among distributed computer facilities. In a first subsection, below, a detailed description of computer hardware, complex computational systems, and virtualization is provided with reference to FIGS. 1-10. In a second subsection, the currently disclosed methods and systems are discussed with reference to FIGS. 11-25.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
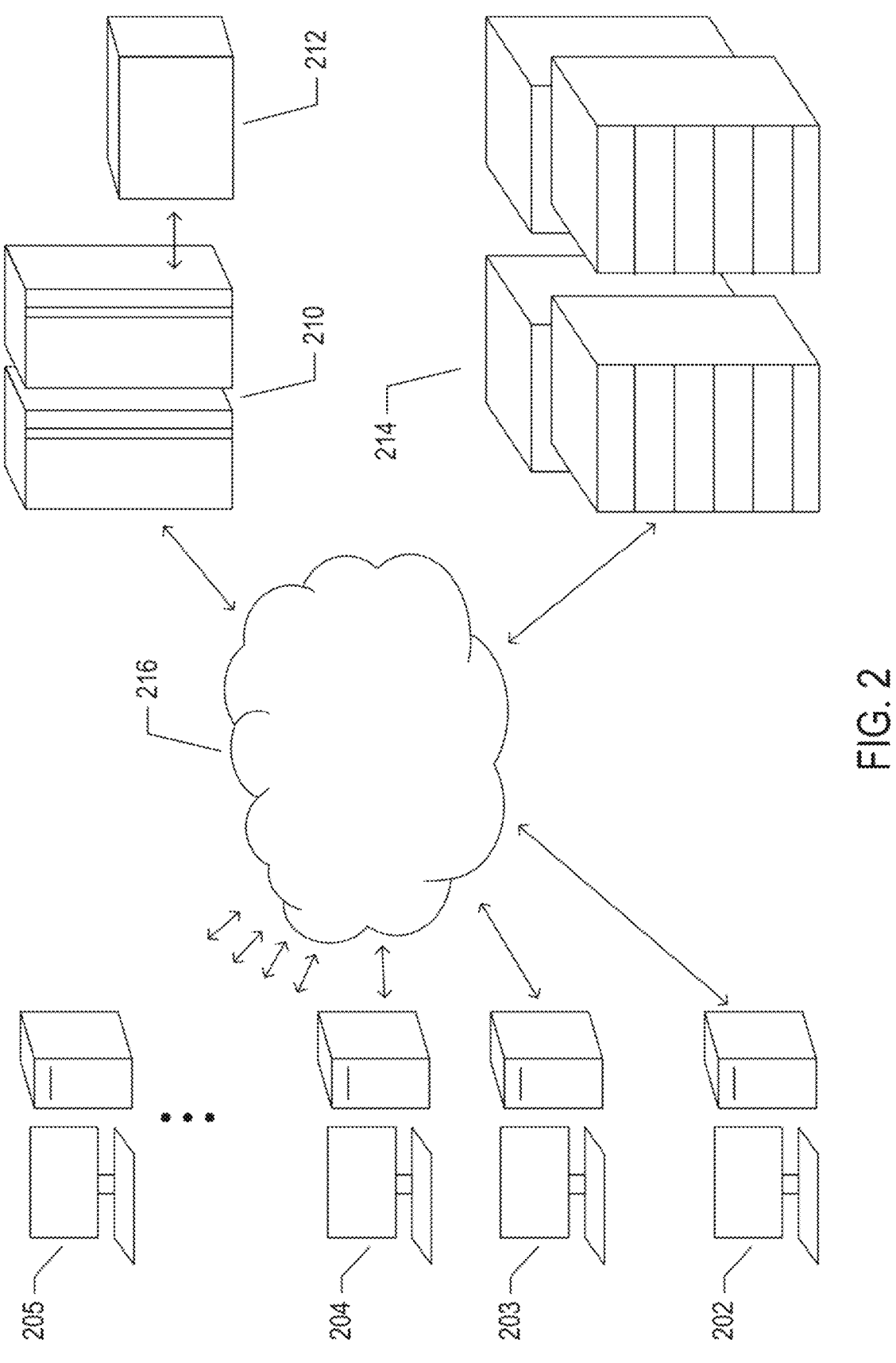
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
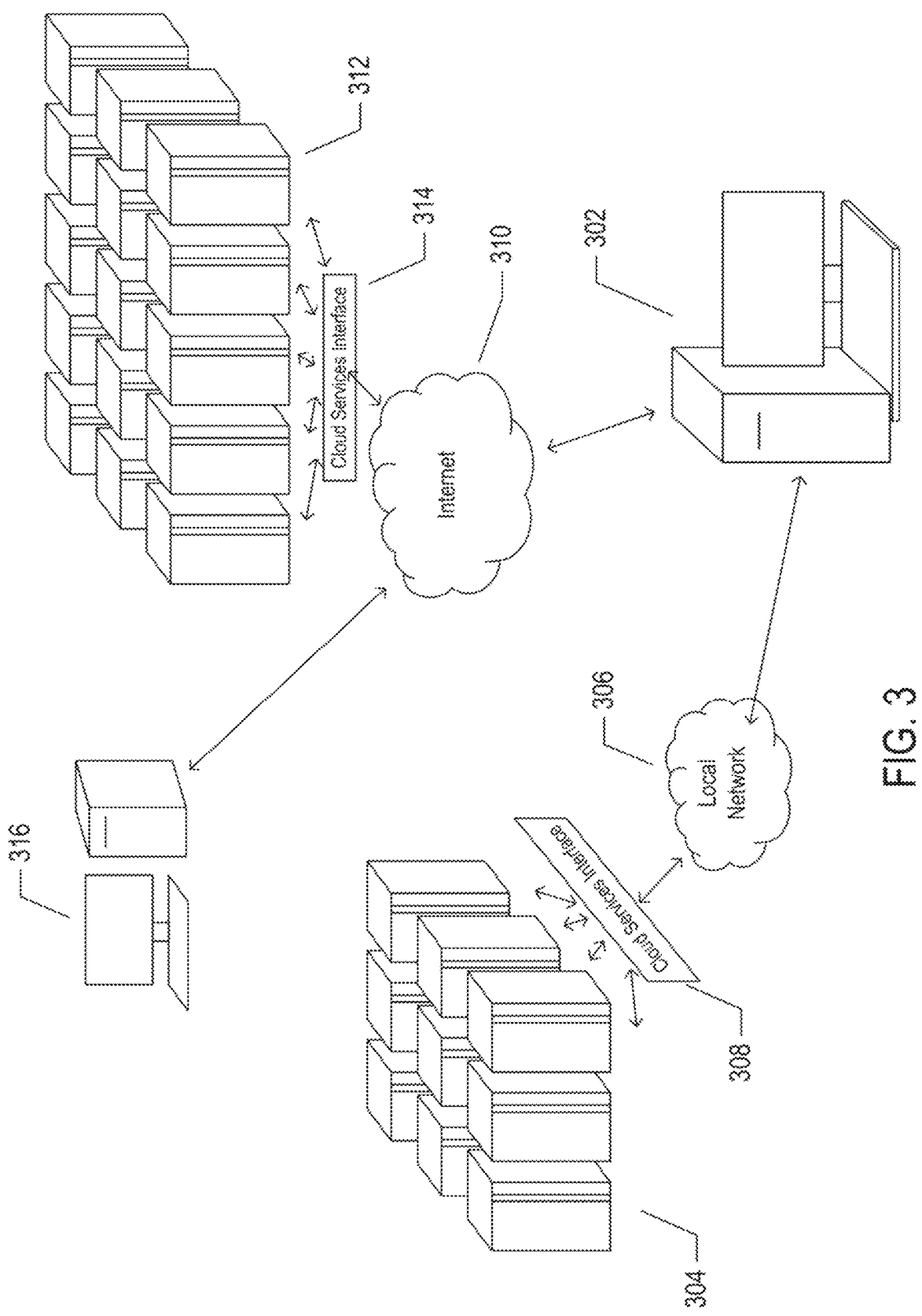
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
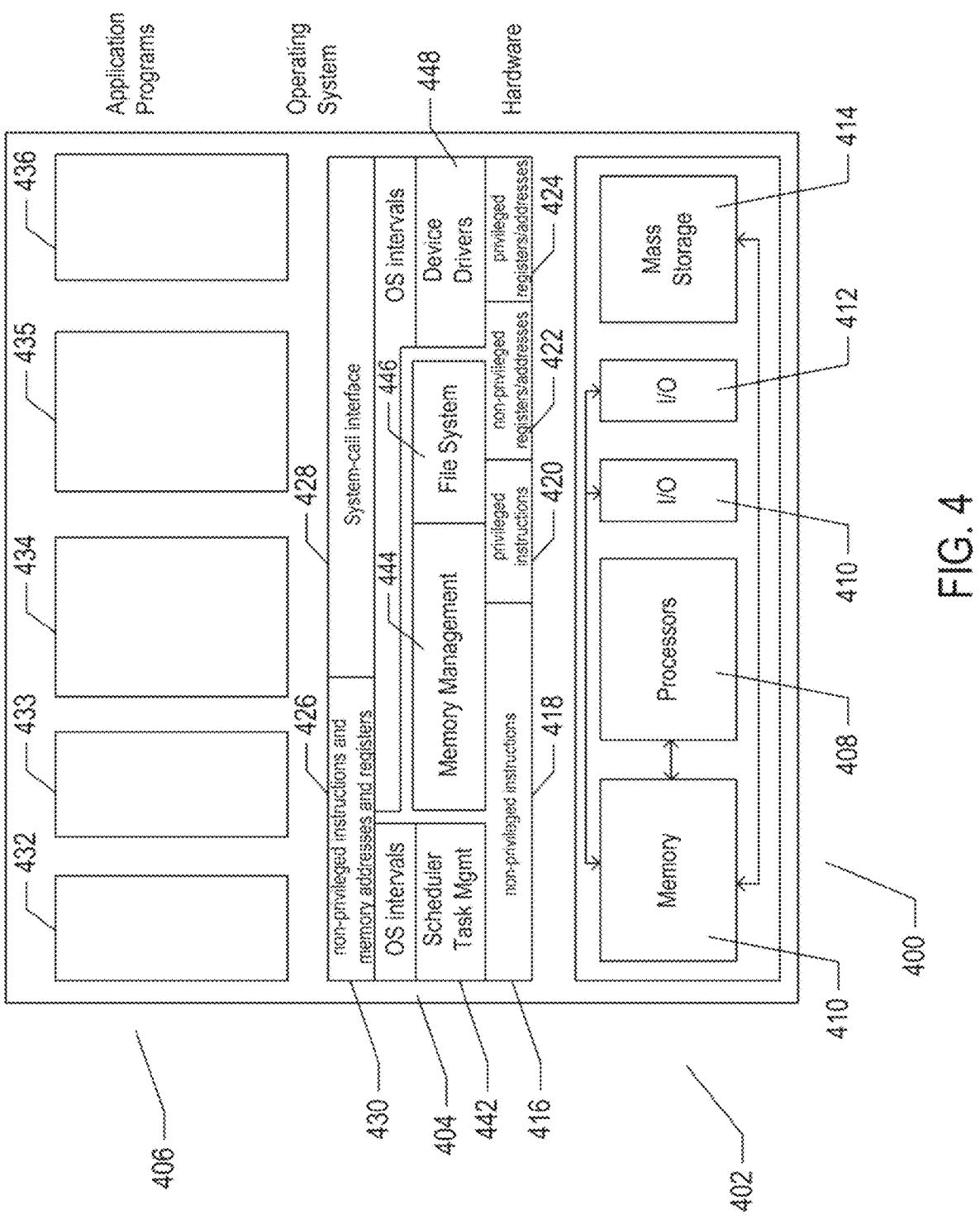
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modem operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
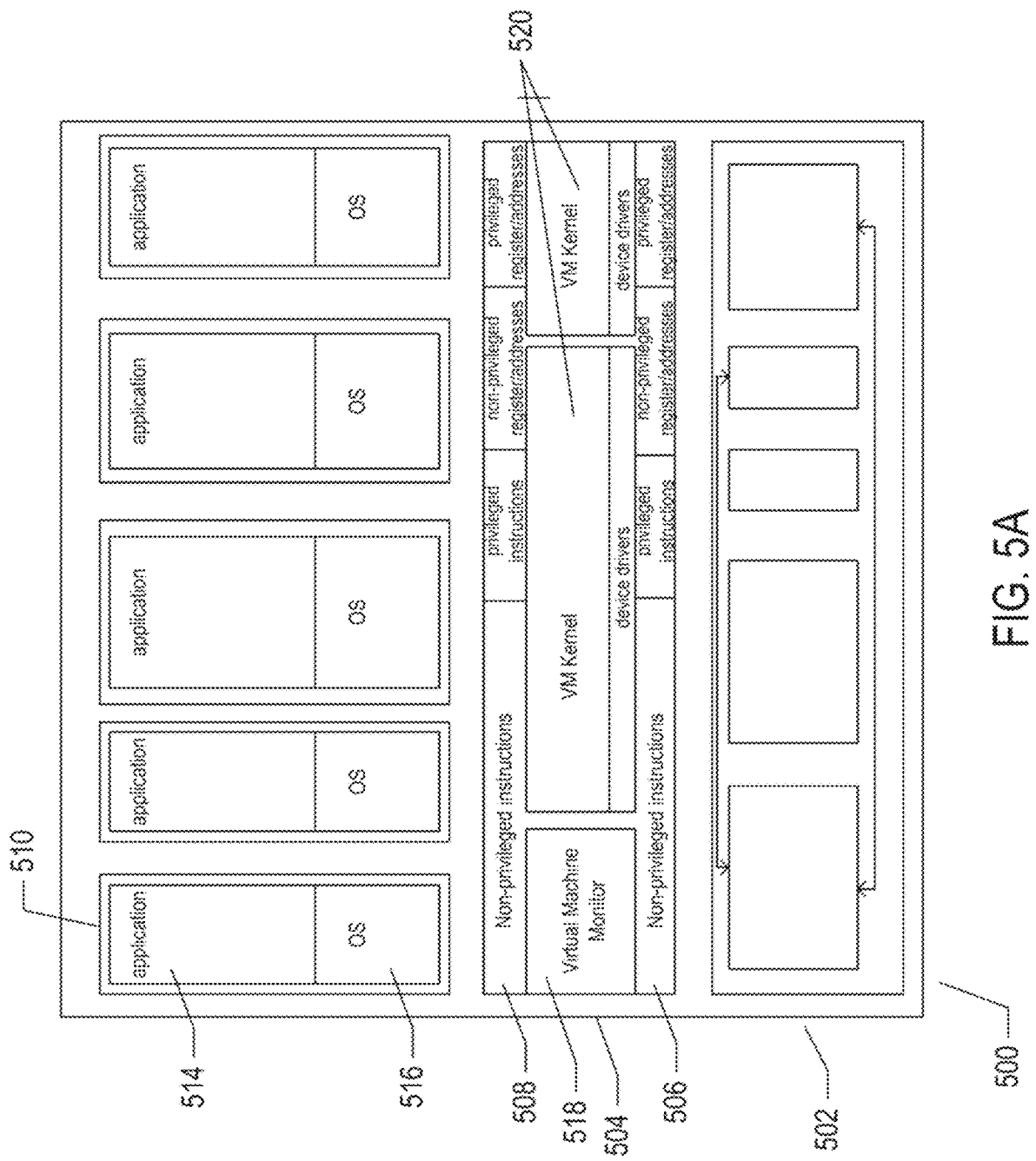
FIGS. 5A-D illustrate two types of virtual machine and virtual-machine execution environments.
Figure 5B:
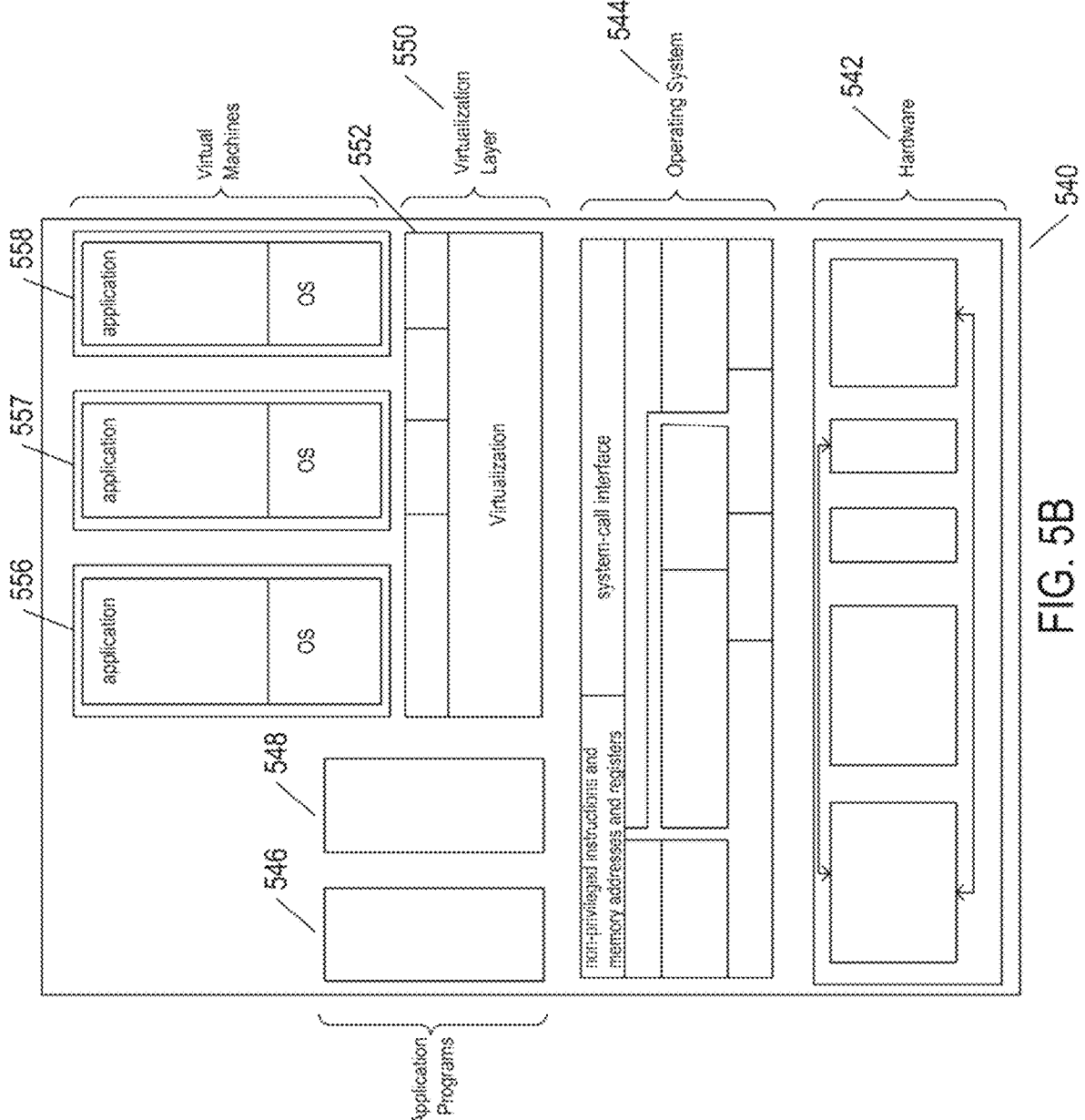

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
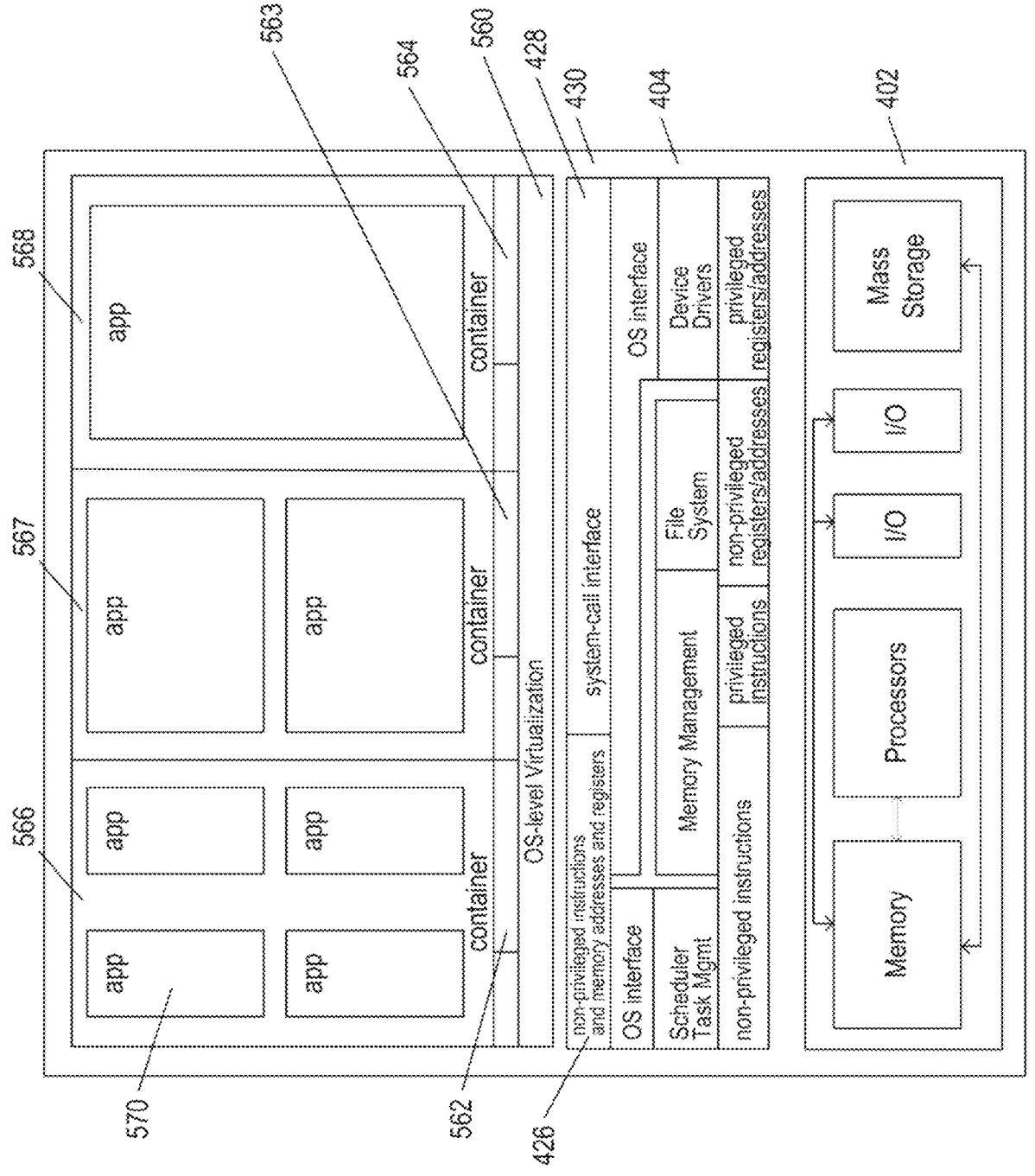

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
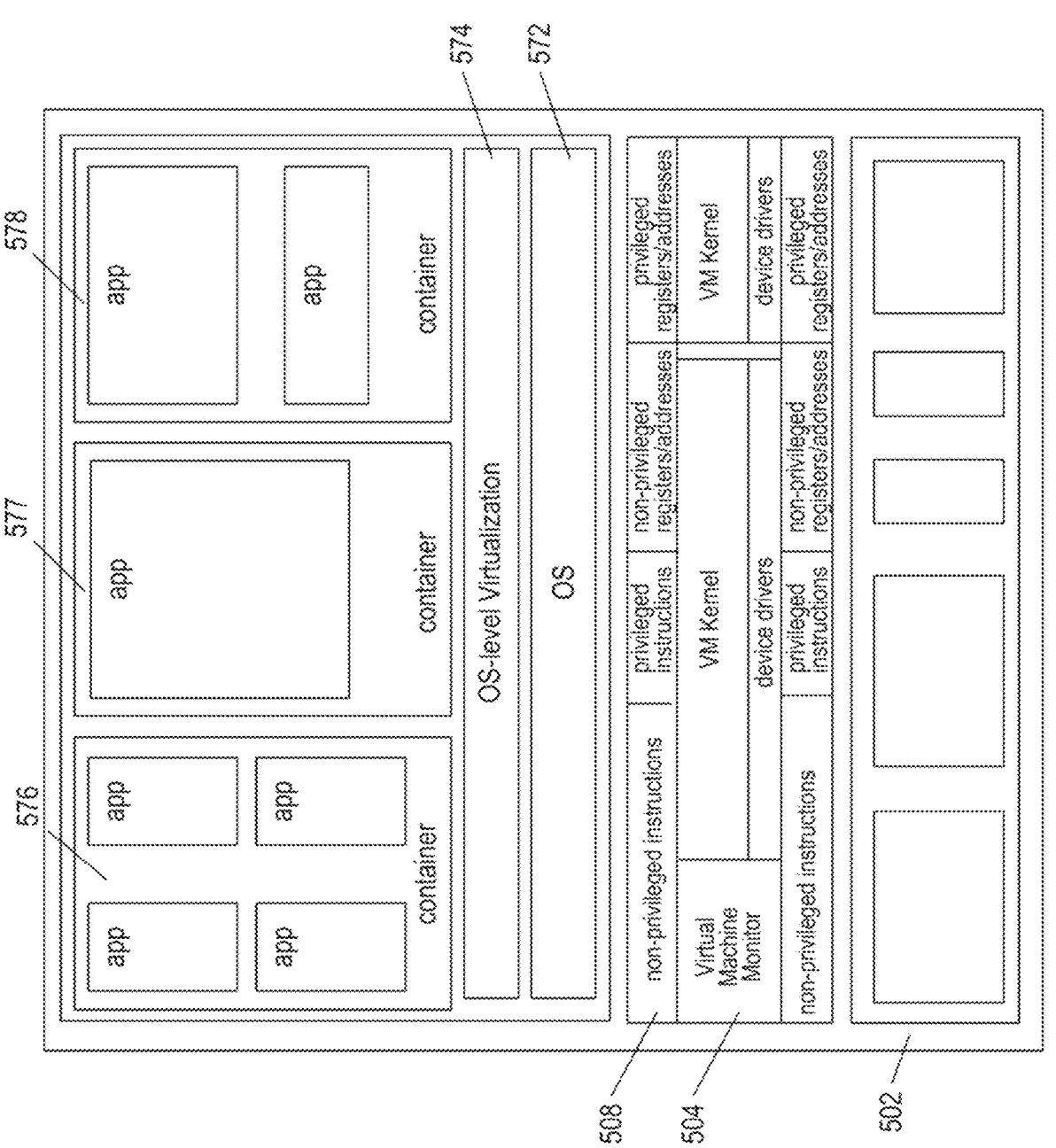

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
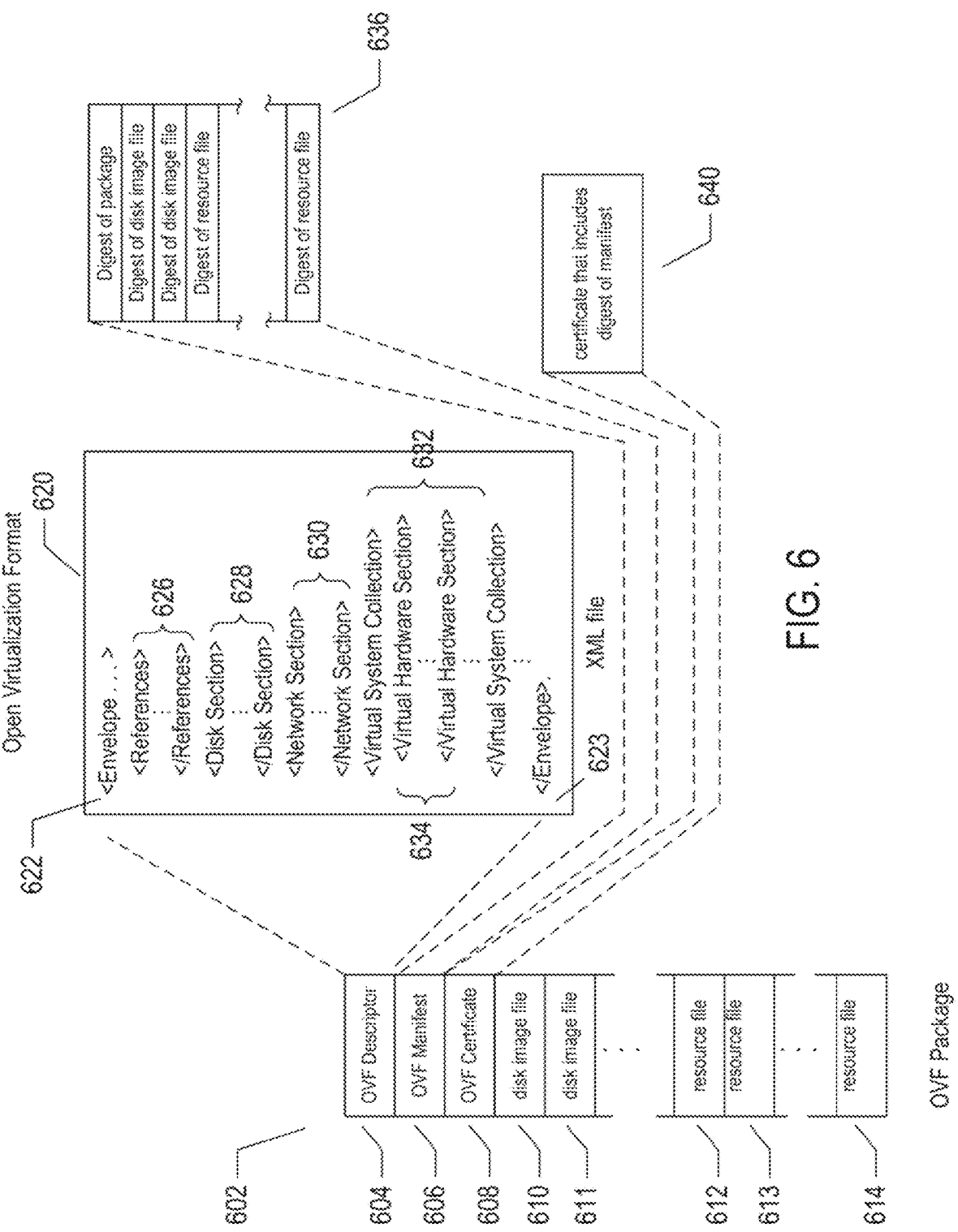
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
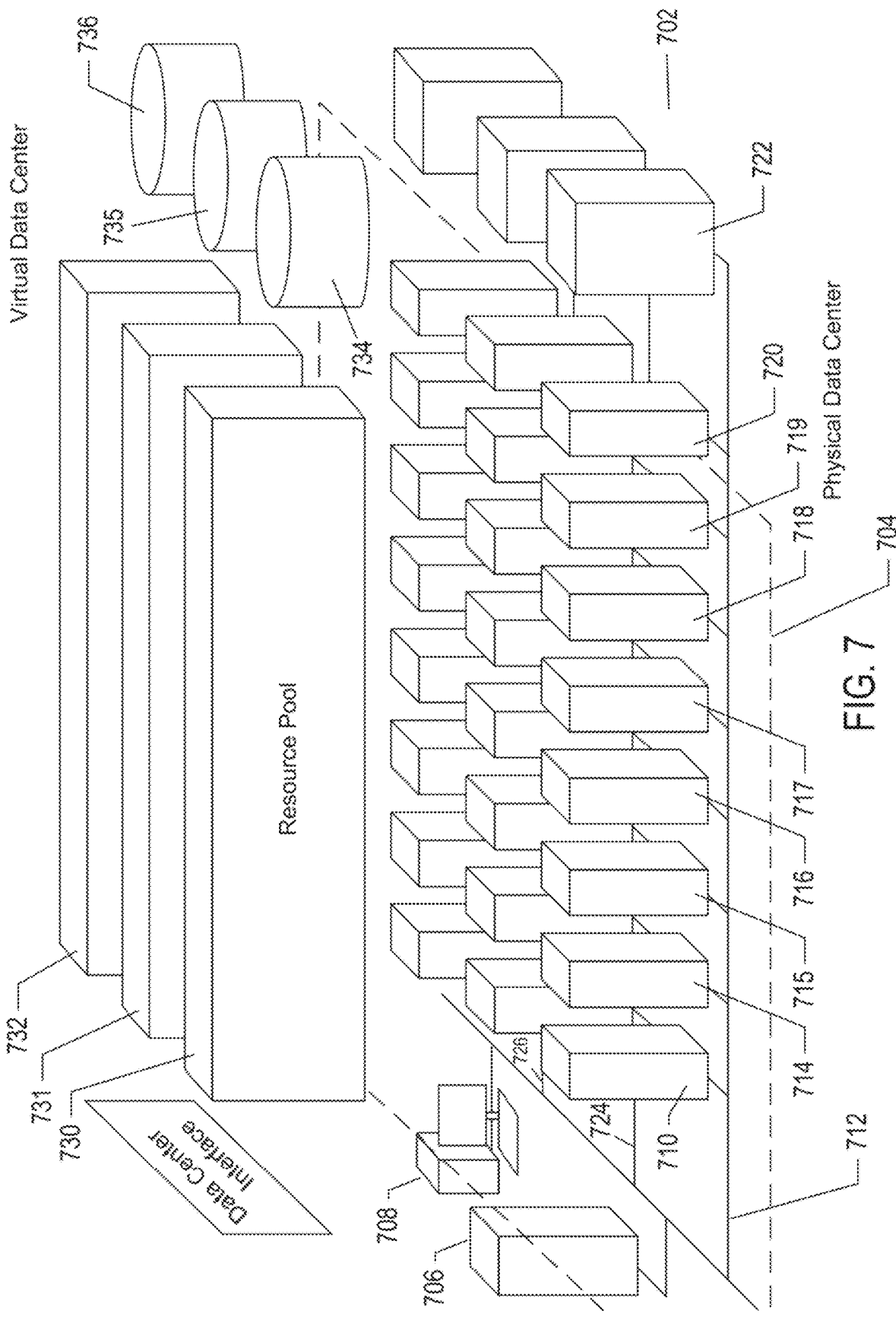
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
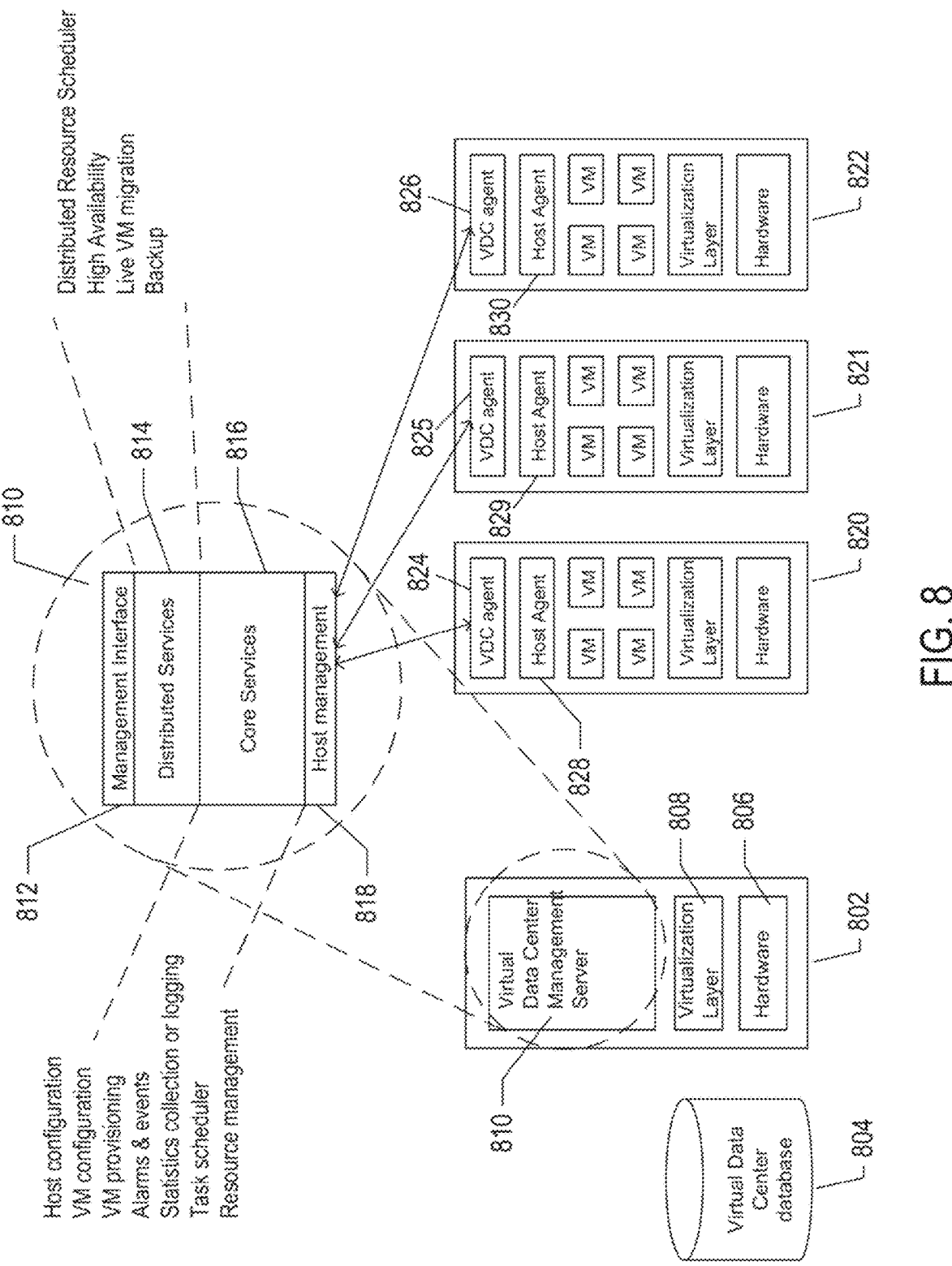
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
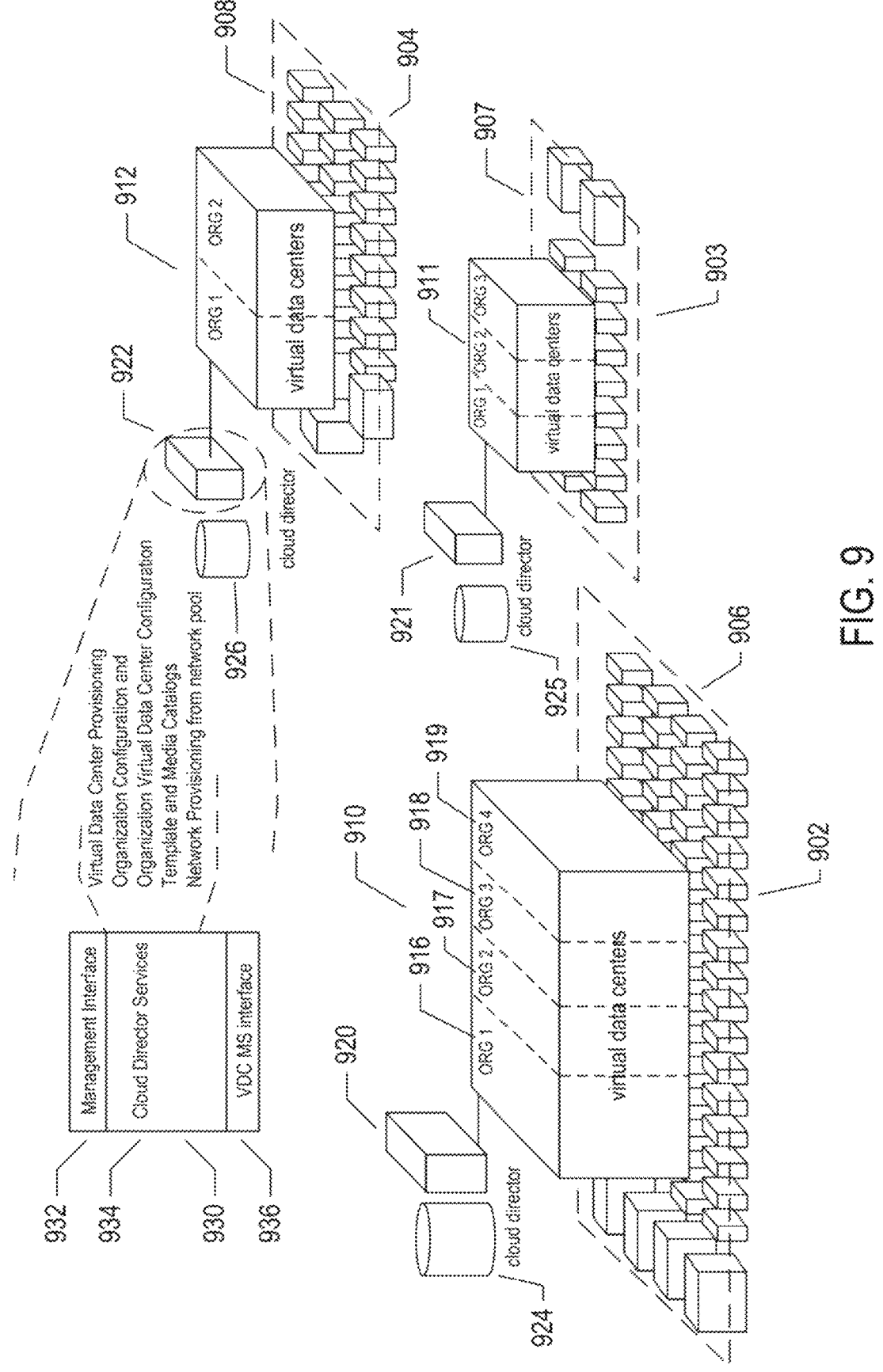
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
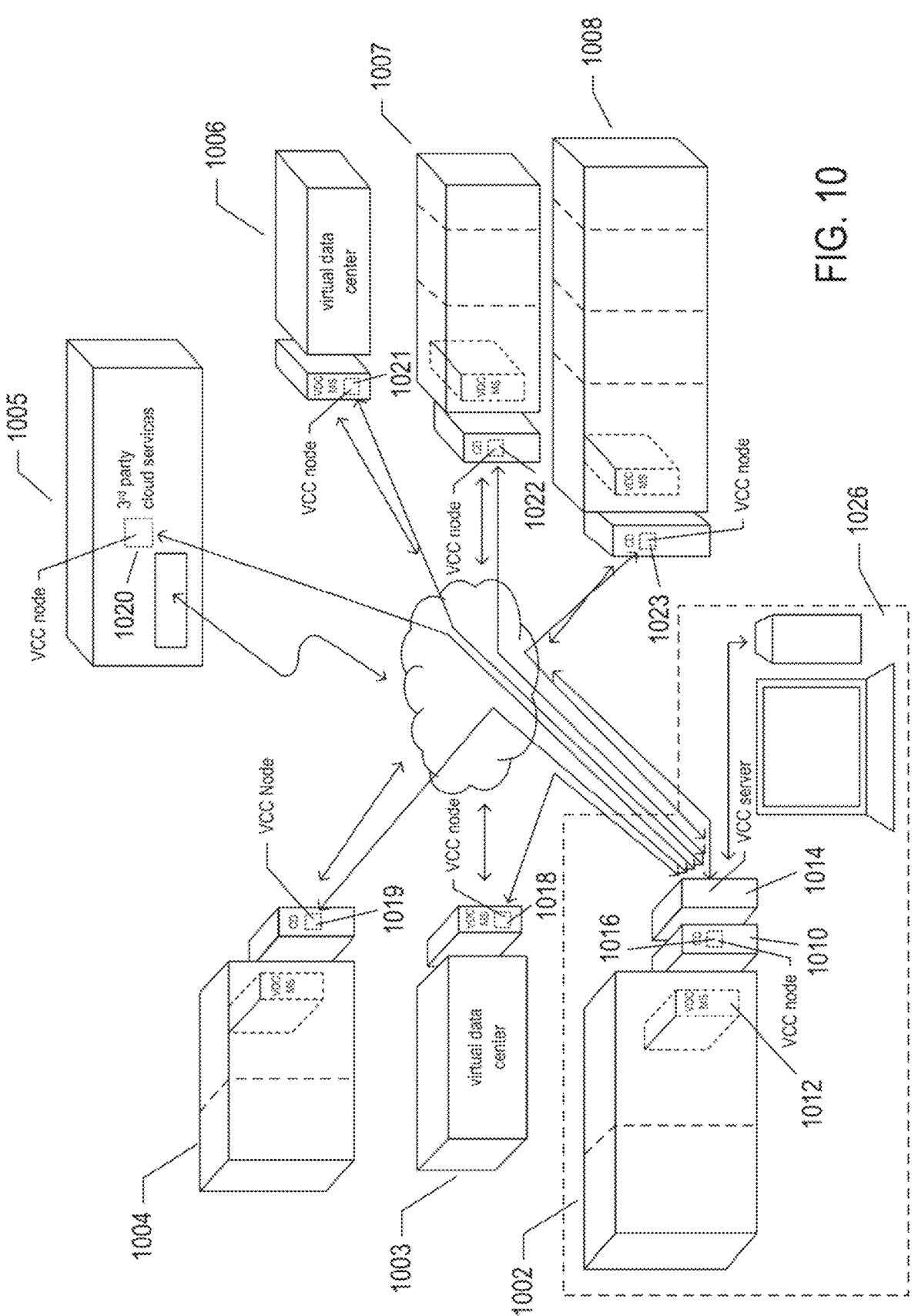
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Modern distributed computing systems feature a variety of different types of automated and semi-automated administration and management systems that detect anomalous operating behaviors of various components of the distributed computing systems, collect errors reported by distributed-computing-system components, and use the detected anomalies and collected errors to monitor and diagnose the operational states of the distributed computing systems in order to automatically undertake corrective and ameliorative actions and to alert human system administrators of potential, incipient, and already occurring problems.

Log/event-message reporting, collecting, storing, and querying systems are fundamental components of administration and management subsystems. The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computing systems. The log/event messages generally include both text and numeric values and represent various types of information, including notification of completed actions, errors, anomalous operating behaviors and conditions, various types of computational events, warnings, and other such information. The log/event messages are transmitted to message collectors, generally running within servers of local data centers, which forward collected log/event messages to message-ingestion-and-processing systems that collect and store log/event messages in message databases. Log/event-message query-processing systems provide, to administrators and managers of distributed computing systems, query-based access to log/event messages in message databases. The message-ingestion-and-processing systems may additionally provide a variety of different types of services, including automated generation of alerts, filtering, and other message-processing services.

Large modern distributed computing systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computing systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers.

Figure 11:
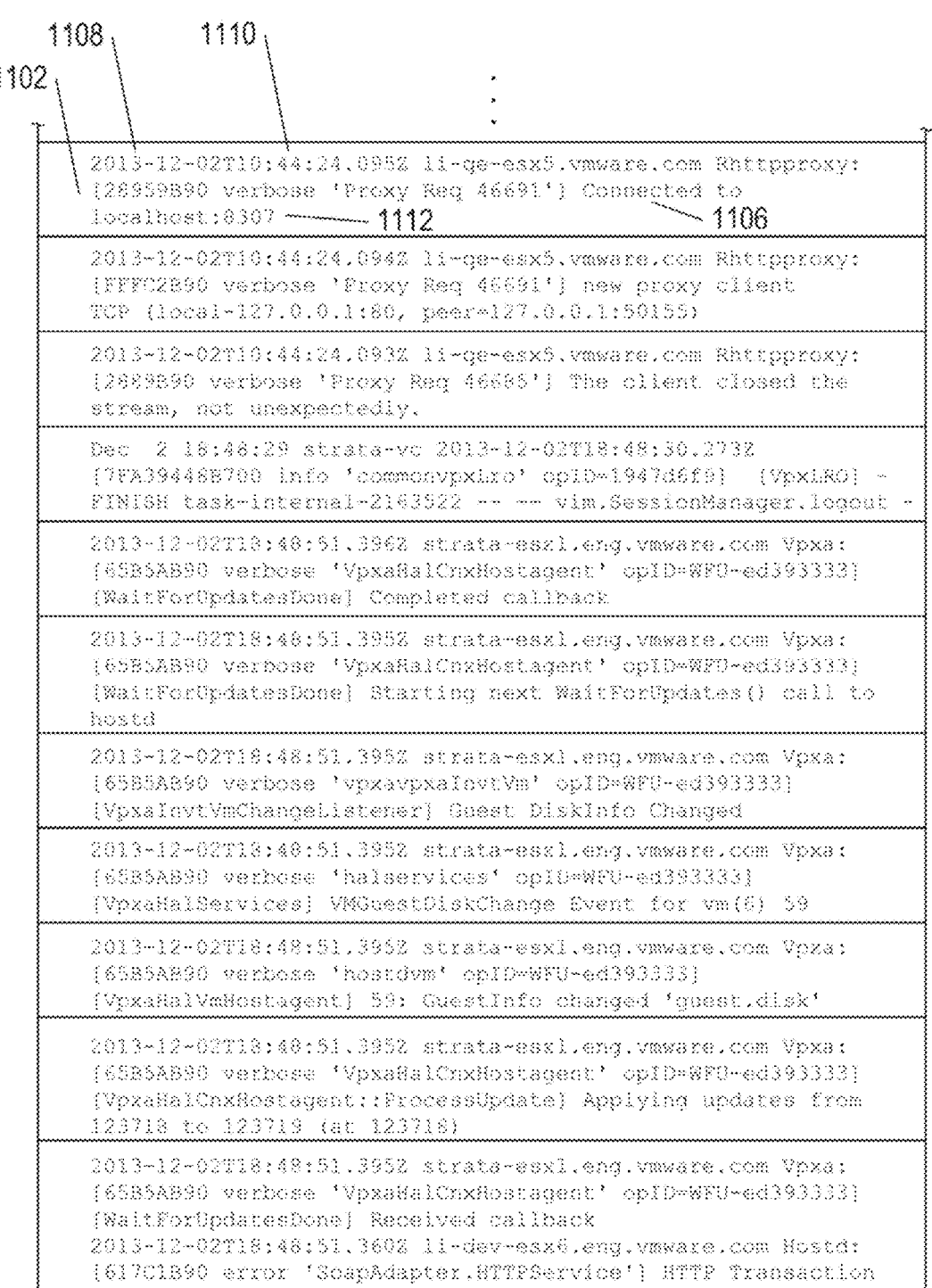
FIG. 11 shows a small, 11-entry portion of a log file from a distributed computer system.

FIG. 11 shows a small, 11-entry portion of a log file from a distributed computer system. A log file may store log/event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
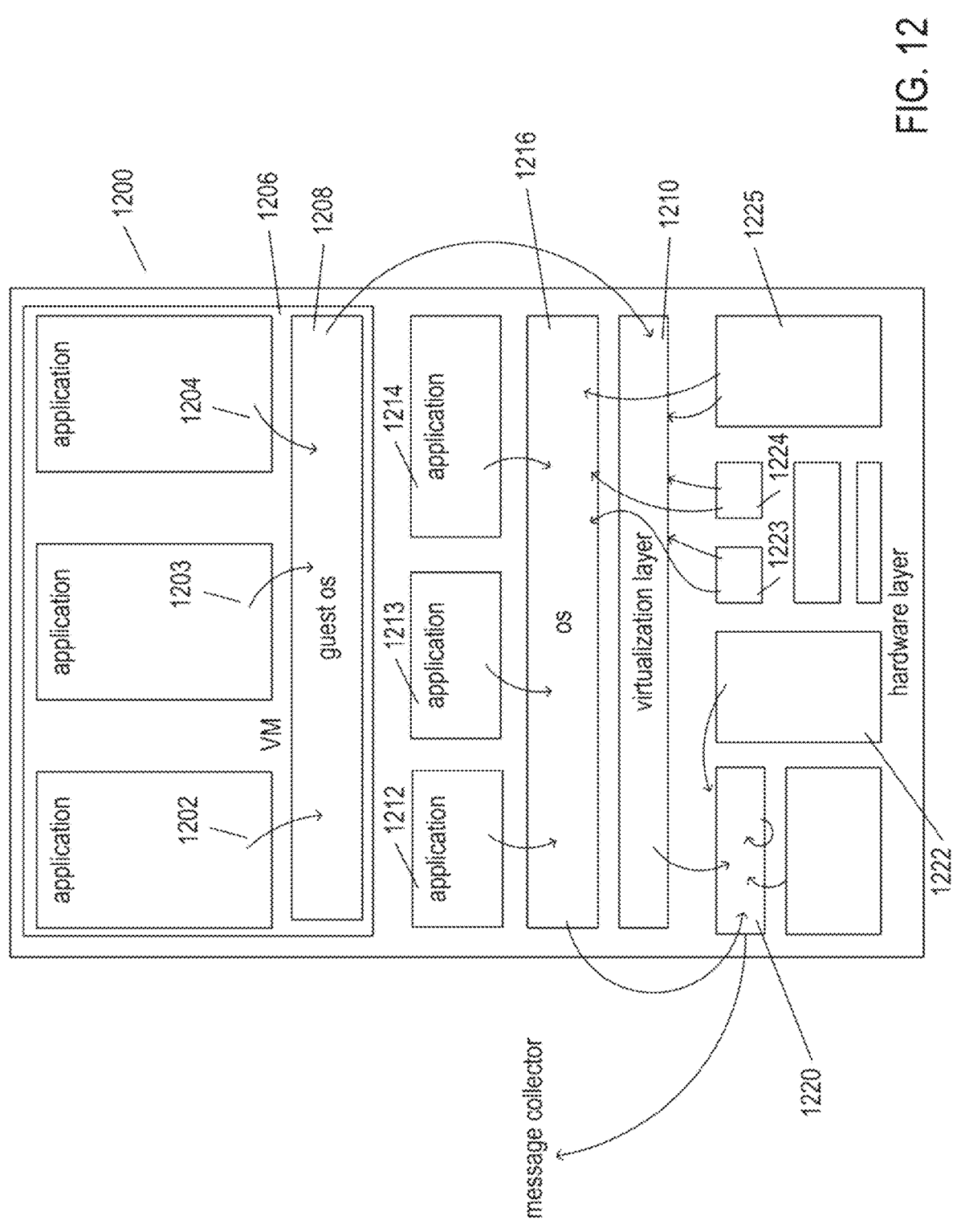
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
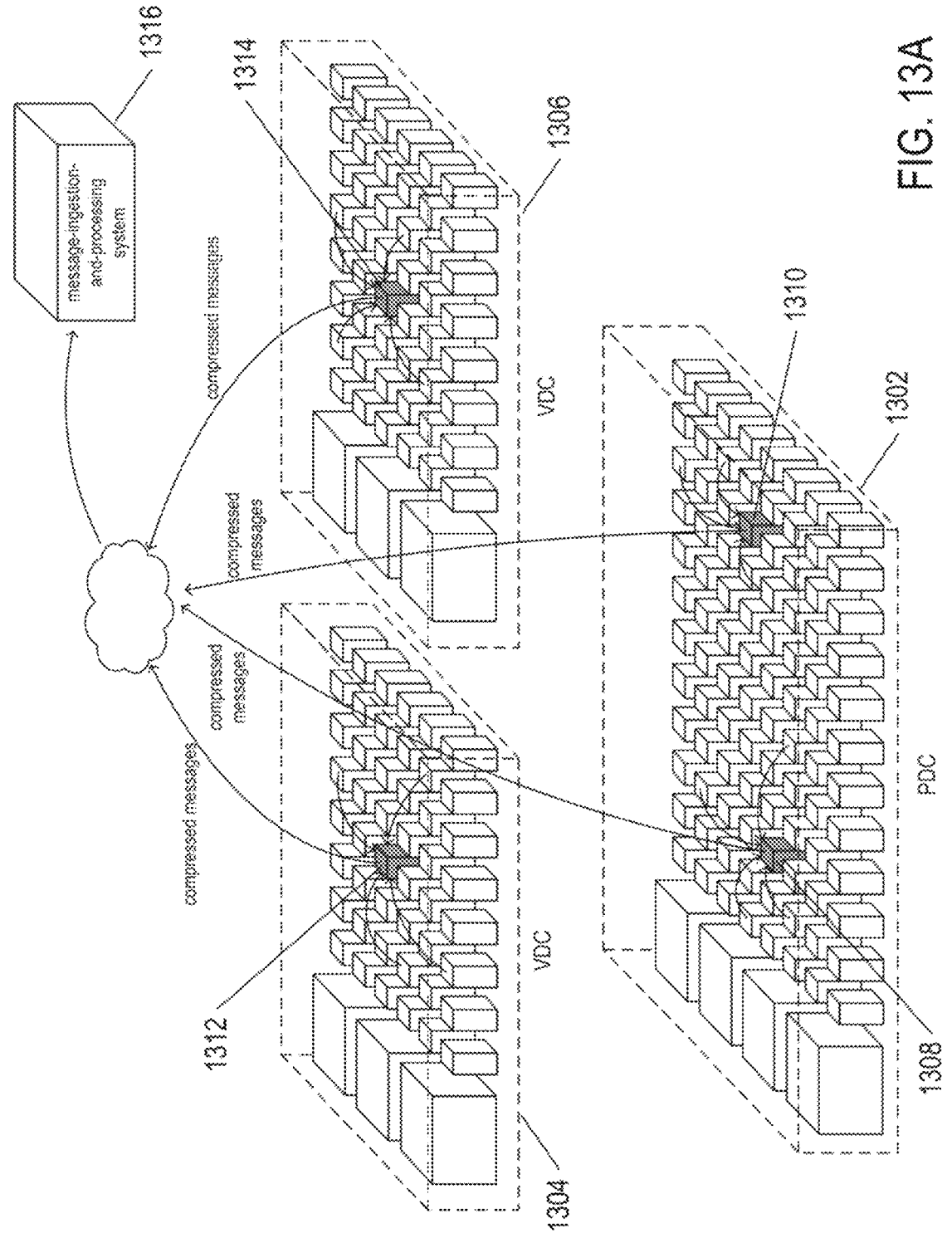
FIGS. 13A-B illustrate two different types of log/event-message collection and forwarding within distributed computer systems.
Figure 13B:
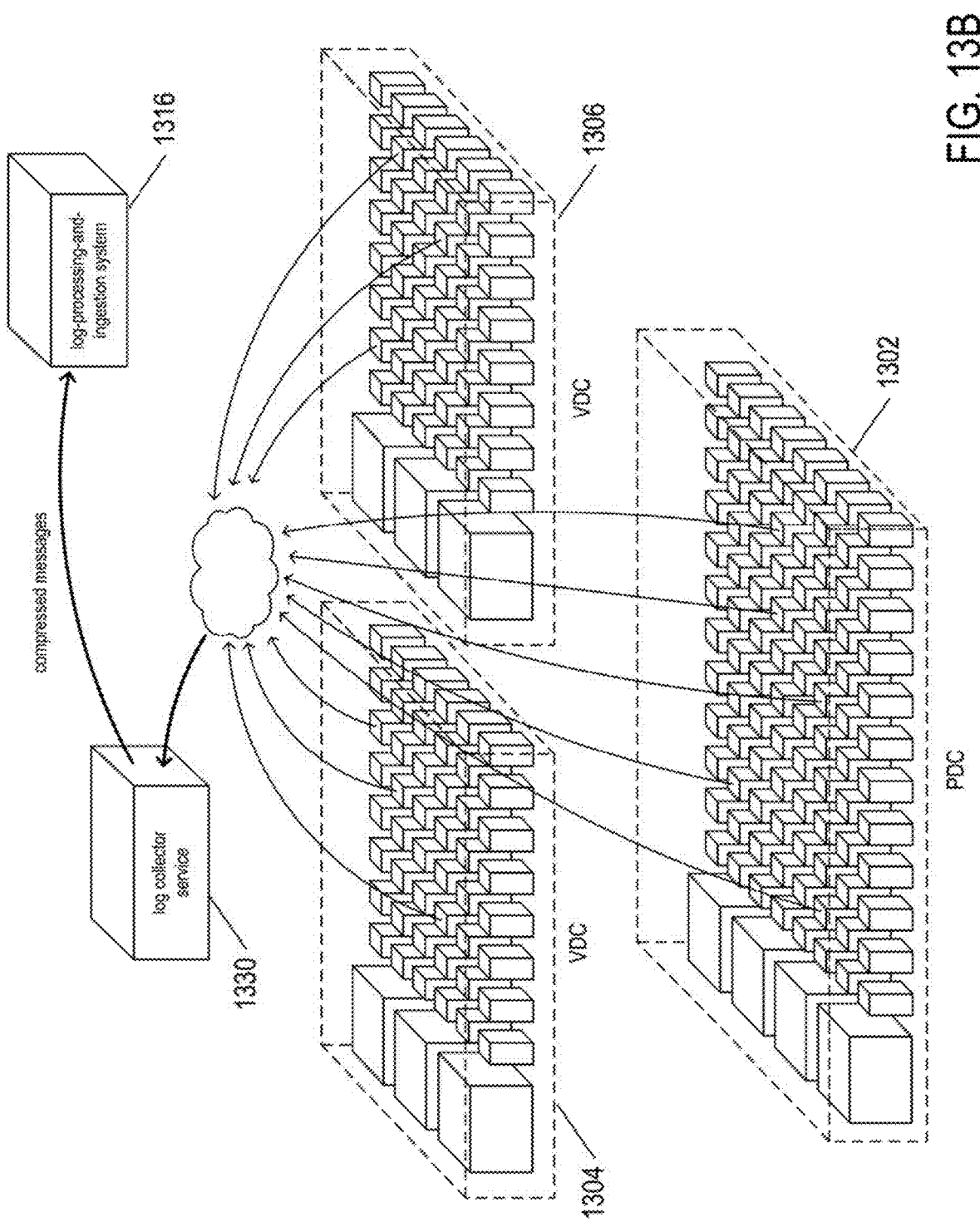

FIGS. 13A-B illustrate two different types of log/event-message collection and forwarding within distributed computer systems. FIG. 13A shows a distributed computing system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of the collected messages and forward the compressed messages to a message-processing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computing system may collect log/event messages generated both at the physical and virtual levels.

FIG. 13B shows the same distributed computing system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

Figure 14:
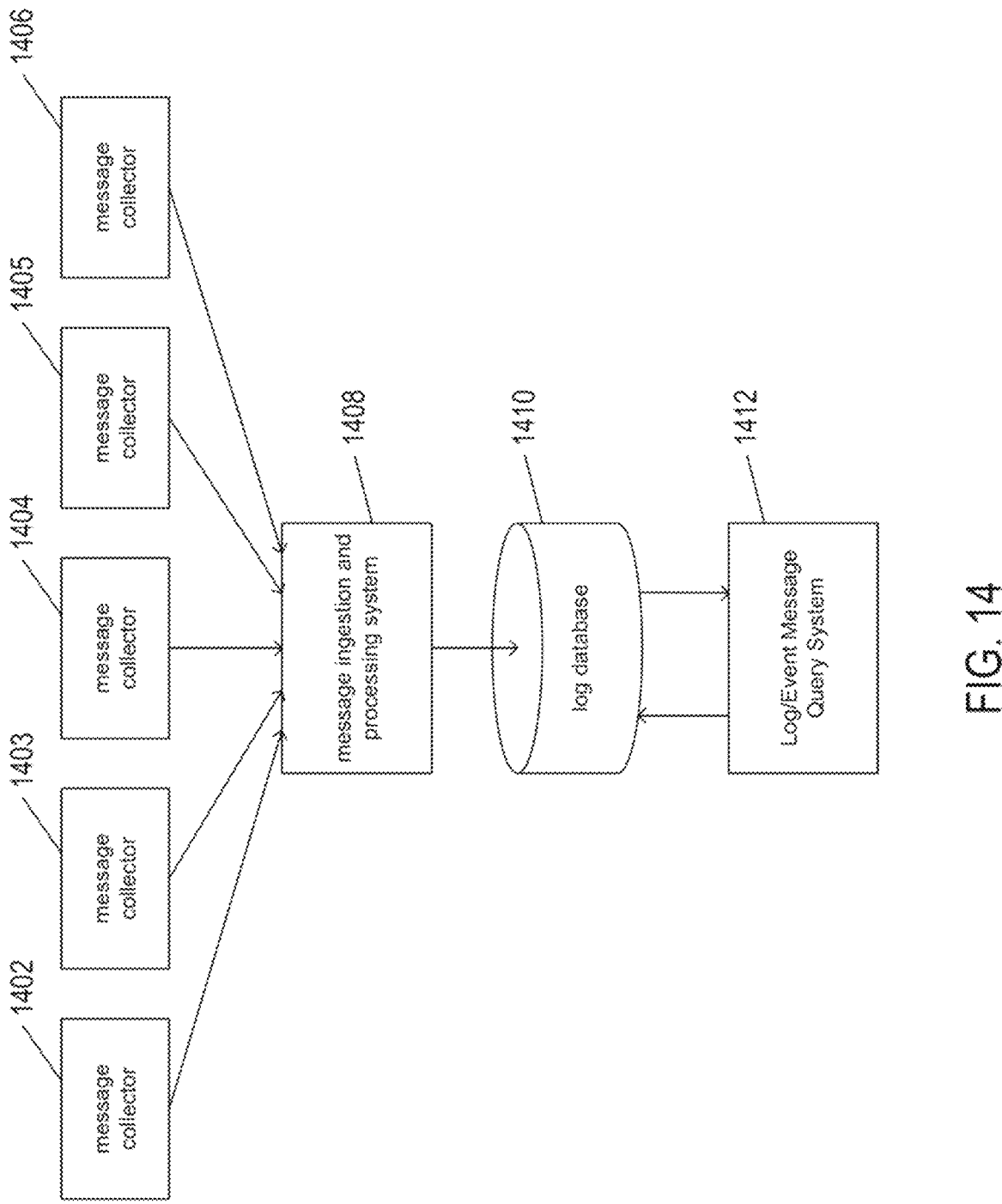
FIG. 14 provides a block diagram of a generalized log/event-message system incorporated within one or more distributed computing systems.

FIG. 14 provides a block diagram of a generalized log/event-message system incorporated within one or more distributed computing systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, and send the compressed batches of log/event messages to a message-ingestion-and-processing system 1408. The message-ingestion-and-processing system decompresses received batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the receive queries for return to the distributed-computer-system administrators and managers and automated administration-and-management systems.

As discussed above, enormous volumes of log/event messages are generated within modern distributed computing systems. As a result, message collectors are generally processor-bandwidth bound and network-bandwidth bound. The volume of log/event-message traffic can use a significant portion of the intra-system and inter-system networking bandwidth, decreasing the network bandwidth available to support client applications and data transfer between local applications as well as between local applications and remote computational entities. Loaded networks generally suffer significant message-transfer latencies, which can lead to significant latencies in processing log/event messages and generating alerts based on processed log/event messages and to delayed detection and diagnosis of potential and incipient operational anomalies within the distributed computing systems. Message collectors may use all or significant portion of the network bandwidth and computational bandwidth of one or more servers within a distributed computer system, lowering the available computational bandwidth for executing client applications and services. Message-ingestion-and-processing systems are associated with similar network-bandwidth and processor-bandwidth overheads, but also use large amounts of data-storage capacities within the computing systems in which they reside. Because of the volume of log/event-message data stored within the message database, many of the more complex types of queries executed by the log/event-message query system against the stored log/event-message data may be associated with significant latencies and very high computational overheads. As the number of components within distributed computing systems increases, the network, processor-bandwidth, and storage-capacity overheads can end up representing significant portions of the total network bandwidth, computational bandwidth, and storage capacity of the distributed computing systems that generate log/event messages.

Figure 15:
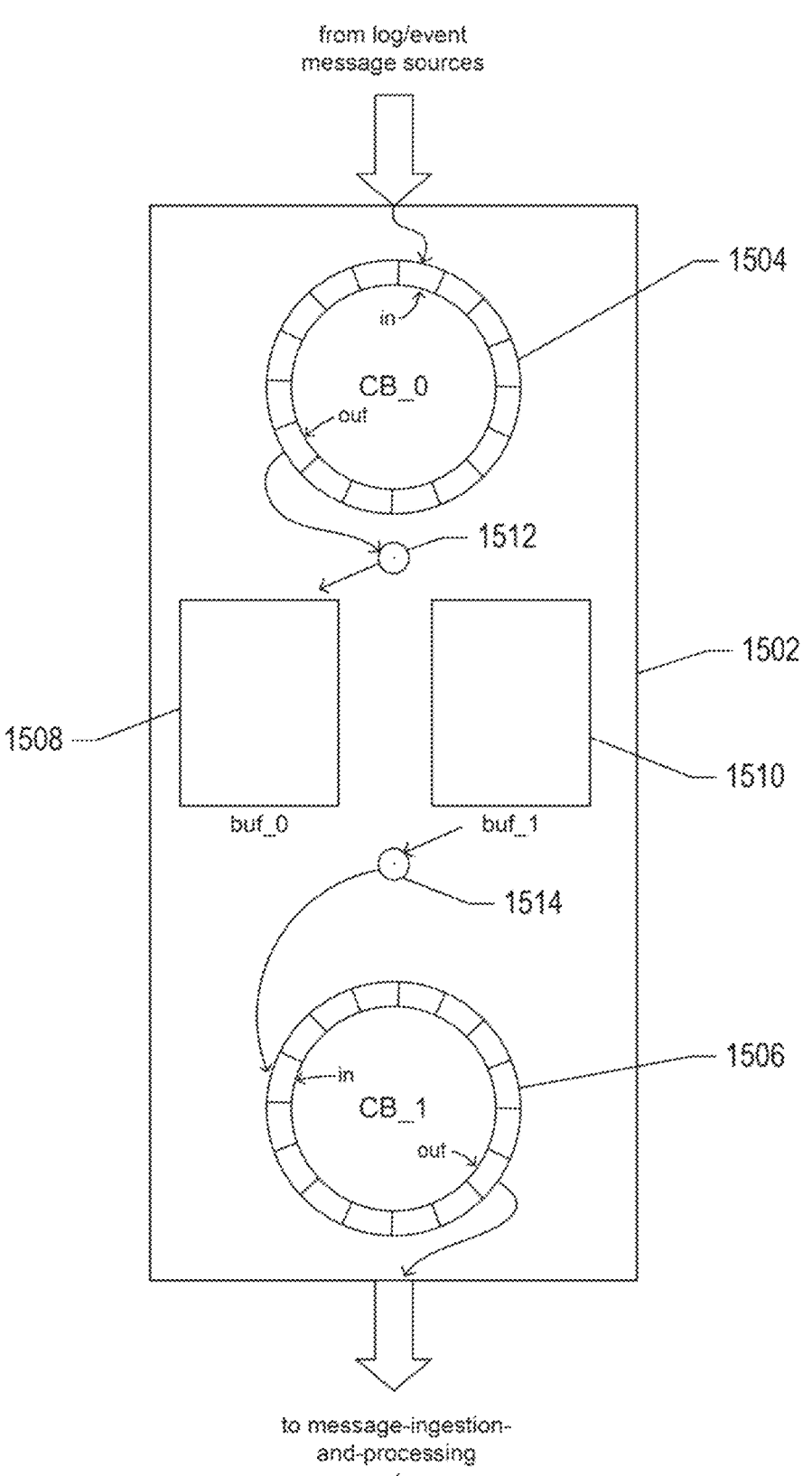
FIG. 15 illustrates an example implementation of a message collector.

FIG. 15 illustrates an example implementation of a message collector. The message collector 1502 includes a first circular buffer 1504, or circular queue, into which messages are input from the network and a second circular buffer 1506, or circular queue, into which outgoing messages containing compressed message batches are input for transmission to a message-ingestion-and-processing system. A first internal buffer 1508 and second internal buffer 1510 are used for message compression. As one of the internal buffers is loaded with messages dequeued from the first circular queue, an encryption method is applied to the other of the internal buffers, already loaded with messages, and the resulting encrypted message batch is output to the second circular queue. The directions of the two switches 1512 and 1514 are then inverted so that encryption can be applied to the now loaded internal buffer while additional messages dequeued from the first circular queue can be loaded into the other, emptied internal buffer. Of course, an actual message collector may be implemented as an application within a virtual machine or as a standalone application or routine, and may include many additional and/or different types of logic and logical components. However, the simple logical implementation shown in FIG. 15 encapsulates salient design features of a message collector. First, the message collector needs to be streamlined for rapid input and processing of log/event messages from log/event-message sources. There is little computational bandwidth available for additional types of message processing, due to the high volumes of log/event messages constantly arriving from the network. Depending on the implementation, certain underlying networking protocols may provide for acknowledgments of incoming log/event messages and guaranteed delivery, but message controllers generally lack the computational resources to provide for sophisticated networking protocols and functionality. In the following control-flow diagrams, the first circular queue is referred to as CB_0, the second circular queue is referred to as CB_1, and the two internal buffers are referred to as buf_0 and buf_1.

Figure 16A:
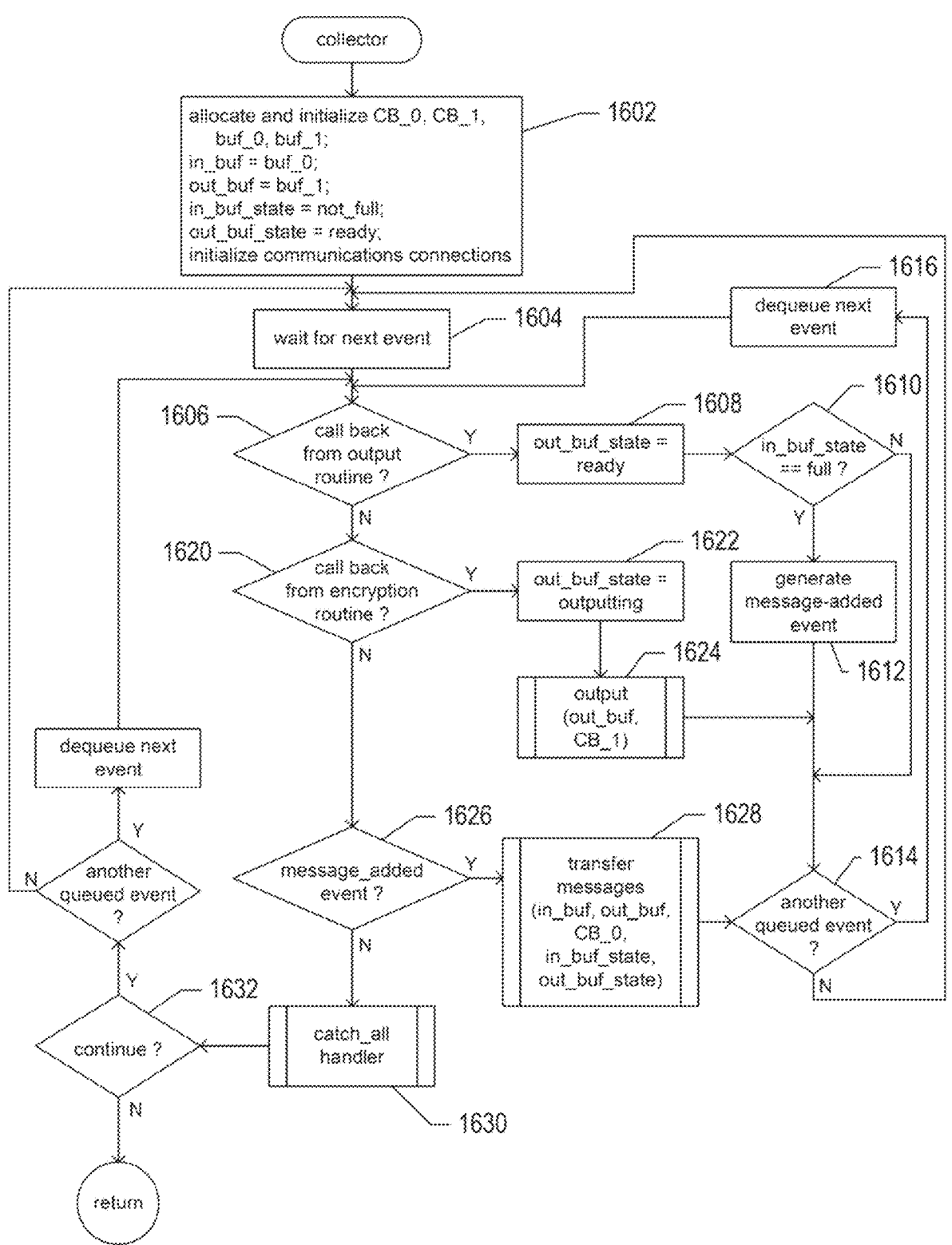
FIGS. 16A-B provide control-flow diagrams for the message controller, discussed above with reference to FIG. 15.
Figure 16B:
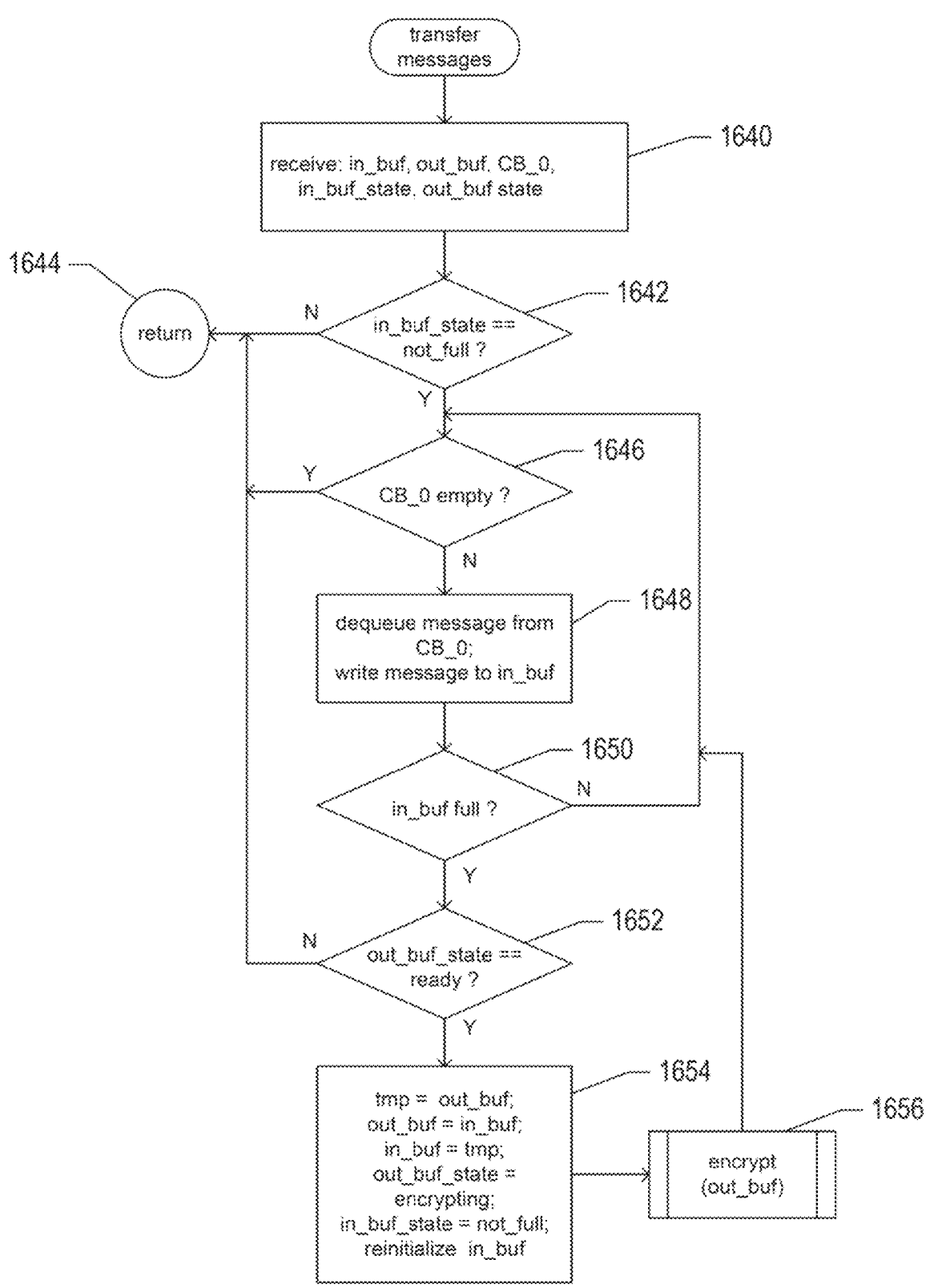

FIGS. 16A-B provide control-flow diagrams for the message controller, discussed above with reference to FIG. 15. FIG. 16A provides a control-flow diagram for a routine collector which embodies an event loop underlying implementation of the message collector. In step 1602, upon power-up or restart, the circular buffers and internal buffers are allocated and initialized, the buffer pointer in_buf is initialized to point to internal buffer buf_0 and the buffer pointer out_buf is initialized to point to internal buffer buf_1, the local variable in_buf_state is set to not_full and the local variable out_buf_state is set to ready, and the communications connections that connect the message collector to the network are initialized. In step 1604, the routine collector waits for the occurrence of a next event. When the next occurring event is a callback from the routine output, as determined in step 1606, control flows to step 1608. The routine output transfers an encrypted batch of messages, in the internal buffer referenced by buffer pointer out_buf, to the network for transmission to the message-ingestion-and-processing system. In step 1608, the local variable out_buf_state is set to ready. When the local variable in_buf_state is equal to full, as determined in step 1610, a message-added event is generated, in step 1612, so that immediate processing of additional messages in the first circular queue CB_0 can resume. Control then flows to step 1614, where the routine collector determines whether or not another event has been queued for handling by the event loop. If so, then a next event is dequeued, in step 1616, and control flows
back to step 1606. Otherwise, control flows back to step
1604, where the routine collector waits for the occurrence of
a next event. When the next occurring event is a callback
from the routine encryption, as determined in step 1620,
control flows to step 1622. The routine encryption encrypts
the batch of messages in the internal buffer referenced by
buffer pointer out_buf. In step 1608, the local variable
out_buf_state is set to outputting. In step 1624, the routine
output is called to output the contents of the internal buffer
referenced by buffer pointer out_buf. Control then flows to
step 1614, described above. When the next occurring event
is a message_added event, generated when additional mes-
sages are added to CB_0, as determined in step 1626, the
routine transfer messages is called in step 1628 to transfer
messages from CB_0 to an internal buffer. Control then
flows to step 1614, described above. A catch-all, or default,
handler is called, in step 1632, to handle any rare or
unexpected events. When the default handler returns with an
indication to continue execution of the event loop, as deter-
mined in step 1632, control flows back to either step 1604
or step 1606 to continue execution of the event loop.

FIG. 16B provides a control-flow diagram for the routine
transfer messages, called in step 1628 of FIG. 16A. In step
1640, the routine transfer messages receives the buffer
pointers in_buf and out_buf, the local variables in_buf_state
and out_buf_state, and a reference to the first circular queue
CB_0. In step 1642, the routine transfer messages deter-
mines if the local variable in_buf_state is currently storing
the value not_full. If not, then the routine transfer messages
terminates, in step 1644, since there is no space in the
internal buffer referenced by in_buf for additional messages.
Otherwise, in step 1646, the routine transfer messages
determines whether or not the circular queue CB_0 is empty.
If the circular queue CB_0 is empty, the routine transfer
messages terminates, in step 1644, since there are no more
messages to input from CB_0. Otherwise, in step 1648, a
next message is dequeued from CB_0 and written to the
internal buffer pointed to by buffer pointer in_buf. If the
internal buffer pointed to by buffer pointer in_buf is now
full, as determined in step 1650, control flows to step 1652.
Otherwise, control flows back to step 1646 for transfer of
another message from the circular queue to the internal
buffer. When the internal buffer is full, then, in step 1652, the
routine transfer messages determines if the local variable
out_buf_state currently stores the value ready. If not, no
further messages can be transferred to internal buffers, and
the routine transfer messages terminates, in step 1644.
Otherwise, in step 1654, the buffer pointers in_buf and
out_buf are switched, the local variables in_buf_state and
out_buf_state are set to not_full and encrypting, respec-
tively, and the internal buffer pointed to by buffer pointer
in_buf is reinitialized. In step 1656, the routine encrypt is
called to encrypt the contents of the internal buffer pointed
to by buffer pointer out_buf, and in step 1658, the local
variable in_buf_state is set to full. In actual implementa-
tions, generation of the event message_added may be turned
off, during execution of the routine transfer messages, and/or
CB_0 may be locked at the beginning of the routine and
unlocked prior to termination of the routine, but, for clarity
of illustration and simplicity of explanation, such low-level
synchronization and event-generation details are not shown
in the control-flow diagrams.

Figure 17:
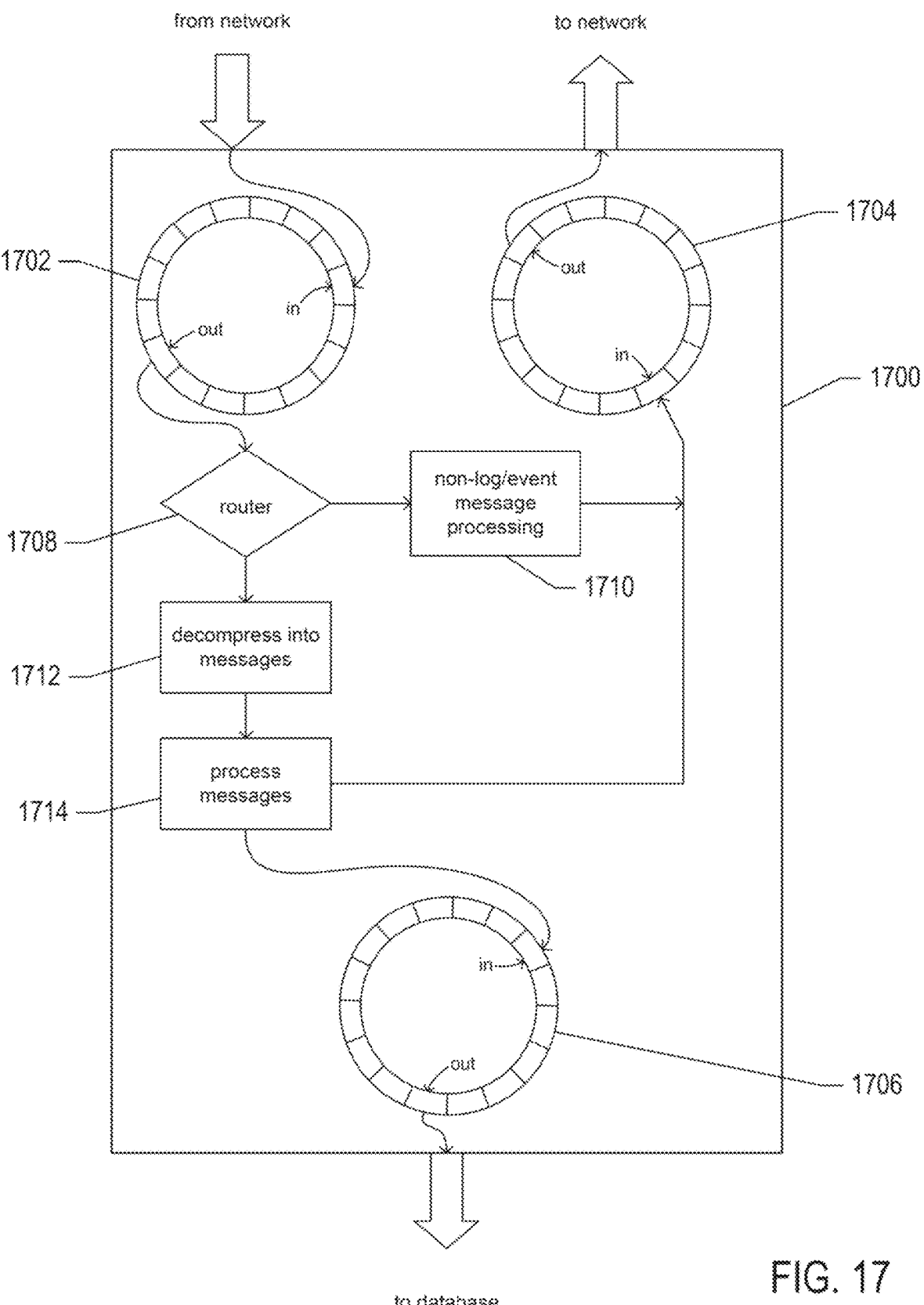
FIG. 17 illustrates a logical implementation of a message-ingestion-and-processing system, using illustration conventions similar to those used in FIG. 15.

FIG. 17 illustrates a logical implementation of a message-
ingestion-and-processing system, using illustration conven-
tions similar to those used in FIG. 15. The message-inges-
tion-and-processing system 1700 is implemented as an application running within the one or more virtual machines
of one or more computer systems or running within execu-
tion environments provided by one or more operating sys-
tems of one or more computer systems. The message-
ingestion-and-processing system connects with the network
via an input circular queue 1702 and an output circular
queue 1704. The message-ingestion-and-processing system
queues processed messages to an output queue 1706 for
storage in a message database. Messages are dequeued from
input queue 1702 and initially fed through an internal router
1708 which forwards non-log/event messages to a process-
ing component for such messages 1710 and forwards com-
pressed batches of log/event messages to a decompression
component 1712. The decompressed messages are pro-
cessed by a log/event-message processing component 1714,
which emits process messages for storage in the message
database. The non-log/event messages may include various
types of administration and management messages used to
configure and control operation of the message-ingestion-
and-processing system. Such messages, of course, follow a
client/server type of protocol, with the message-ingestion-
and-processing system responding to such messages by
queuing responses to output circular buffer 1704. The mes-
sage-processing component 1714 may carry out various
types of processing functions, including filtering the mes-
sages so that only desired and relevant log/event messages
are stored in the message database, recognizing critical
messages for which alerts are generated and encoded in alert
messages that are queued to the output queue 1704, normal-
izing message content for storage in the message database to
facilitate subsequent query processing, and other such pro-
cessing functions. The log/event message query system
(1412 in FIG. 14) provides a query-based interface to the
message database that allows administrators, managers,
automated administration-and-management systems, and
other users to extract specified types of log/event messages
from the message database in order to facilitate various
types of administration and management tasks. The log/
event message query system is often implemented by a
conventional database management system, such as a rela-
tional database management system, that may be configured
with a variety of pre-constructed queries and stored routines
to facilitate access to the message database.

Figure 18A:
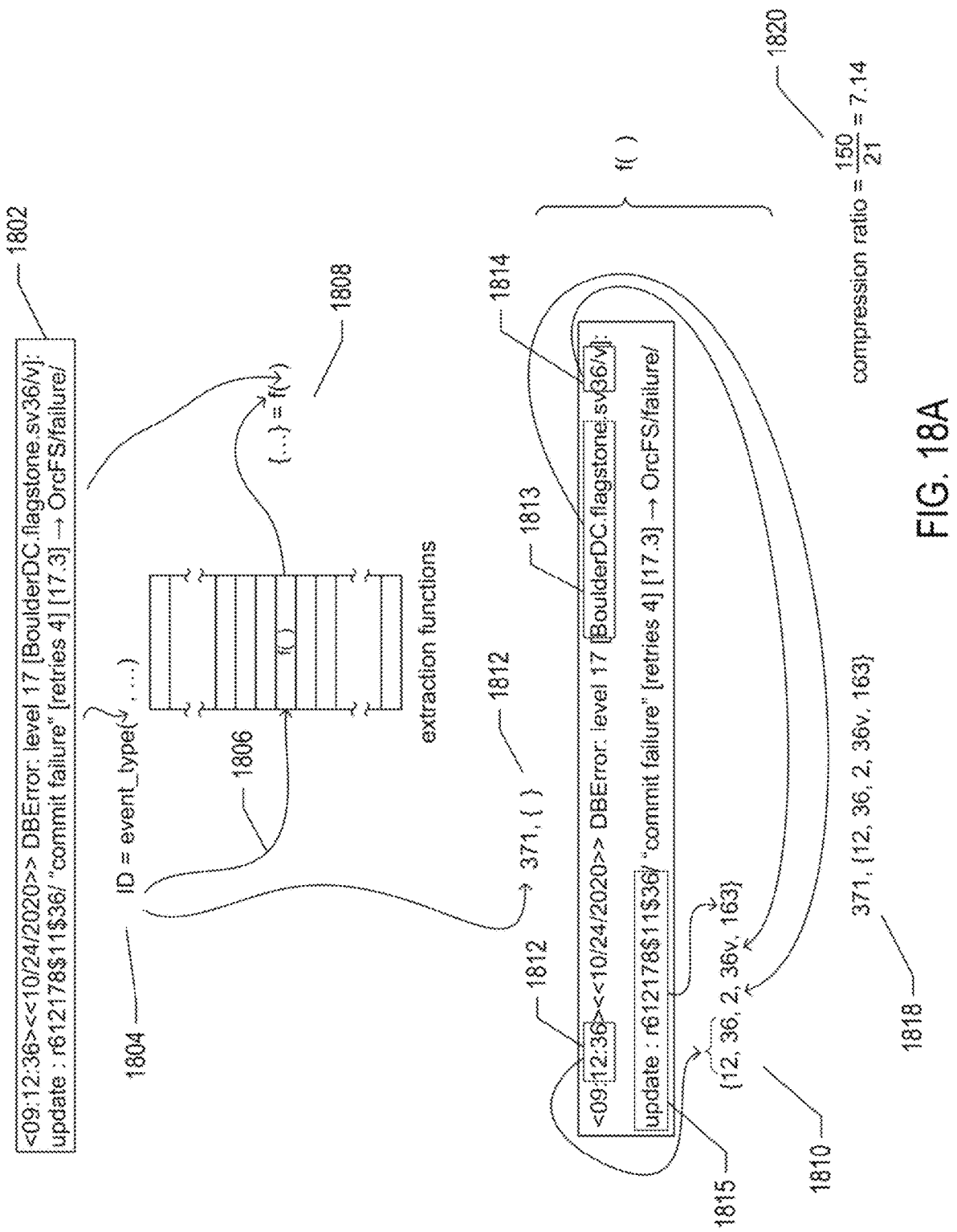
FIGS. 18A-B illustrate a method that compresses log/event messages to facilitate many of the improvements to log/event-message reporting, collection, storage, and subsequent access disclosed in the current document.
Figure 18B:
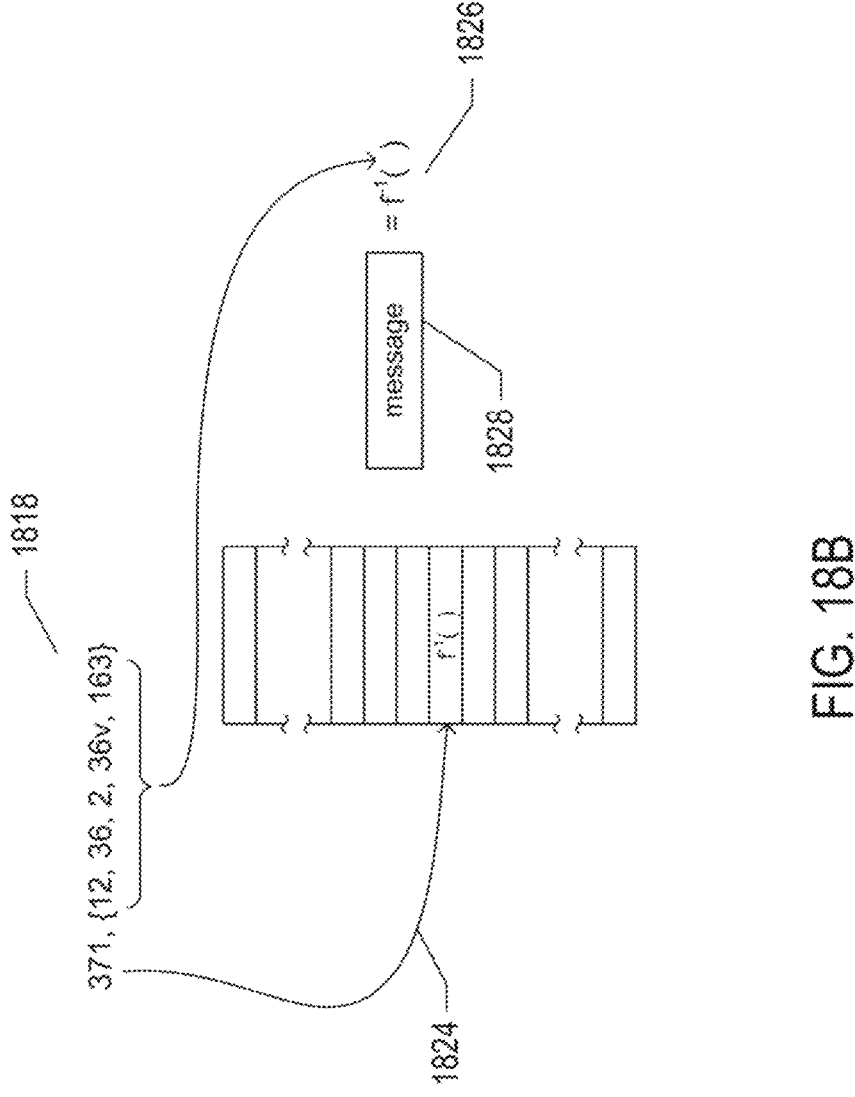

FIGS. 18A-B illustrate a method that compresses log/
event messages to facilitate many of the improvements to
log/event-message reporting, collection, storage, and subse-
quent access disclosed in the current document. A hypo-
thetical log/event message 1802 is shown at the top of FIG.
18A. As is typical for log/event messages, log/event mes-
sage 1802 includes numerous formatted fields and phrases
with significant meanings that cannot be discerned from the
contents of the log/event message, alone. Either by auto-
mated, semi-automated, or manual means, a log/event mes-
sage can be processed to determine a message type, referred
to below as an "event type," corresponding to the message
and to determine a list of numeric values and/or character
strings that correspond to variables within a log/event mes-
sage. In other words, log/event messages are associated with
types and log/event messages contain static and relatively
static portions with low information content and variable
portions with high information content. Thus, as shown in
FIG. 18 A, log/event message 1802 can be automatically
processed 1804 to generate an event type, referred to as "ID"
in FIGS. 18A-B. This processing is encapsulated in the
function event_type( ). Implementation of the function
event_type( ) can vary, depending on the distributed com-
puting systems that generate the log/error messages. In certain cases, relatively simple pattern-matching techniques can be used, along with regular expressions, to determine the event type for a given log/error message. In other implementations, a rule-based system or a machine-learning system, such as a neural network, can be used to generate an event type for each log/error message and/or parse the log/error message. In certain cases, the event type may be extracted from an event-type field of event messages as a numerical or character-string value. The event type can then be used, as indicated by curved arrow 1806 in FIG. 18A, to select a parsing function $f(\ )$ for the event type that can be used to extract the high-information-content, variable values from the log/event message 1808. The extracted variable values are represented, in FIG. 18A and subsequent figures, by the notation "{ ... }," or by a list of specific values within curly brackets, such as the list of specific values "{12, 36, 2, 36v, 163}" 1810 shown in FIG. 18A. As a result, each log/event message can be alternatively represented as a numerical event type, or identifier, and a list of 0, 1, or more extracted numerical and/or character-string values 1812. In the lower portion of FIG. 18A, parsing of log/event message 1802 by a selected parsing or extraction function $f$) is shown. The high-information variable portions of the log/event message are shown within rectangles 1812-1815. These portions of the log/event message are then extracted and transformed into the list of specific values "{12, 36, 2, 36v, 163}" 1810. Thus, the final compressed form of log/event message 1802 is an ID and a compact list of numeric and character-string values 1818. In this case, the compression ratio for compressing the log/event message 1802 to expression 1818 can be calculated 1820 as 7.14. In many cases, much higher compression ratios can be obtained. In general, the compression ratios obtained by this process are far higher than those obtained by even the best of general data-compression methods. As shown in FIG. 18B, there exists an inverse process for generating the original log/error message from the expression 1818 obtained by the compression process discussed above with reference to FIG. 18A. The event type, or ID, is used to select, as indicated by curved arrow 1824, a message-restoration function $f^1(\ )$ which can be applied 1826 to the expression 1818 obtained by the compression process to generate the original message 1828. In certain implementations, the decompressed, or restored, message may not exactly correspond to the original log/event message, but may contain sufficient information for all administration/management needs. In other implementations, message restoration restores the exact same log/event message that was compressed by the process illustrated in FIG. 18A.

A variety of techniques and approaches to generating or implementing the above-discussed event_type( ) function and extraction and message-restoration functions $f(\ )$ and $f^1(\ )$ are possible. In certain cases, these functions can be prepared manually from a list of well-understood message types and message formats. Alternatively, these functions can be generated by automated techniques, including clustering techniques, or implemented by machine-learning techniques.

Figure 19A:
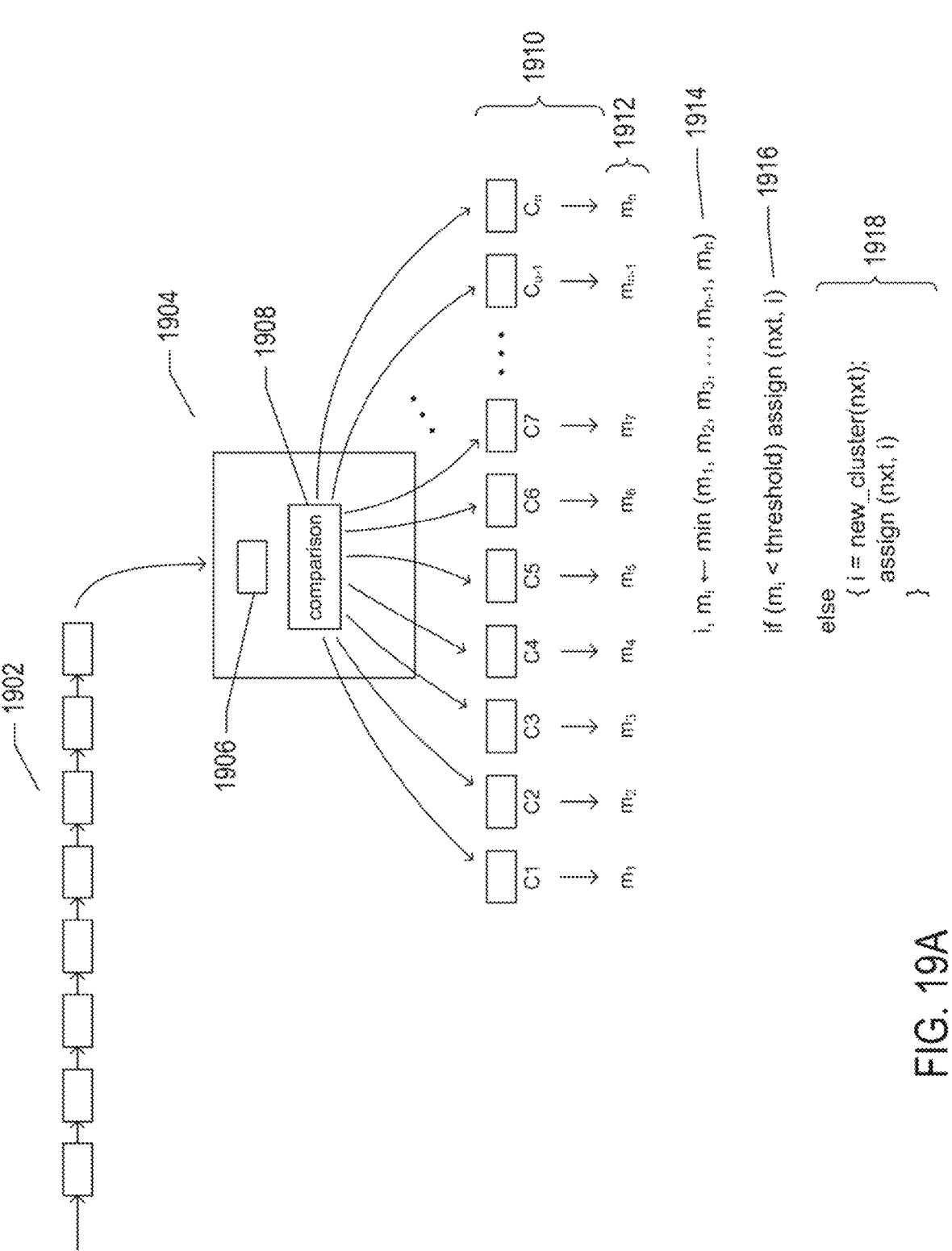
FIGS. 19A-C illustrate a clustering technique for generating an event_type( ) function and extraction and message-restoration functions $f( )$ and $f^1( )$.
Figure 19B:
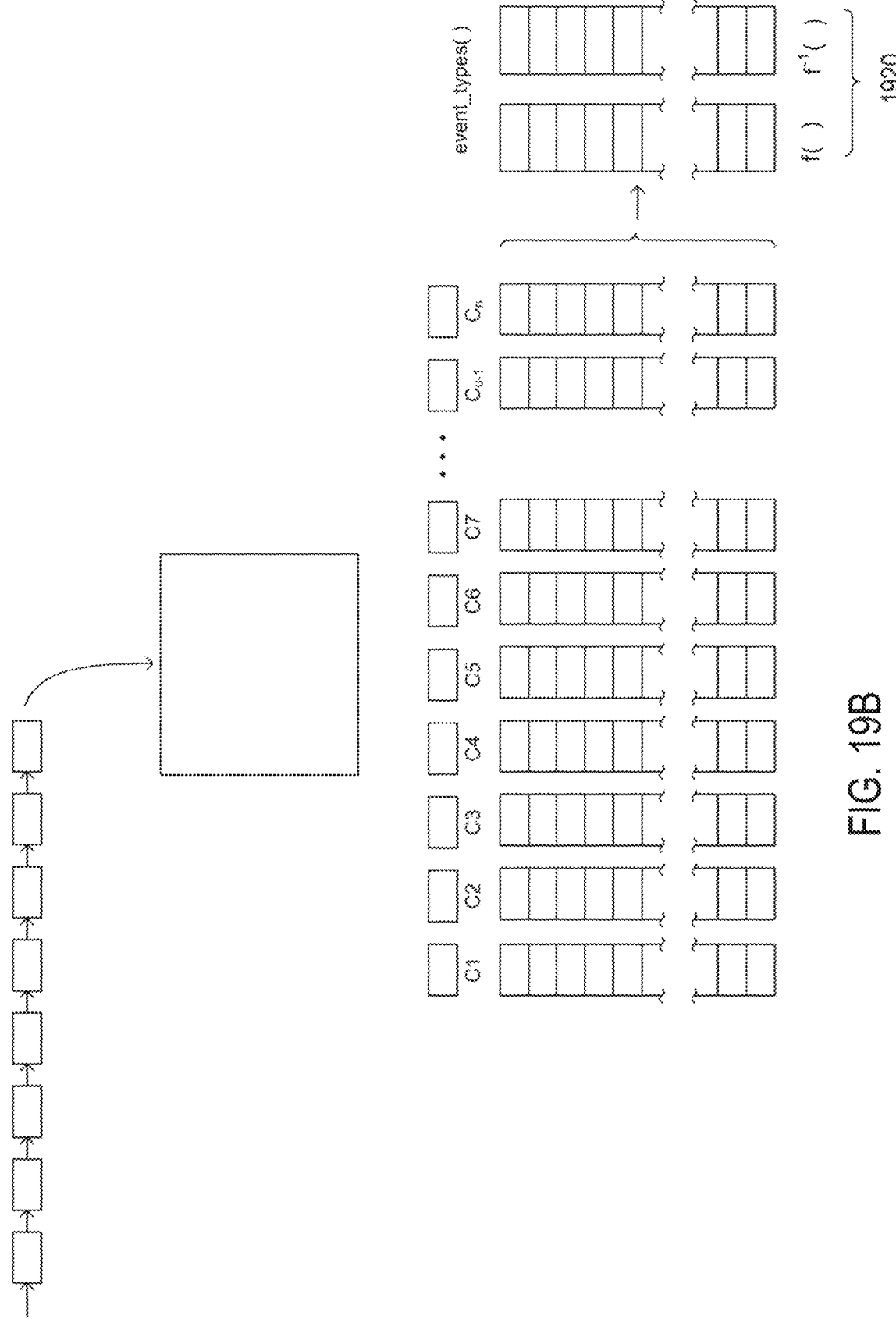
Figure 19C:
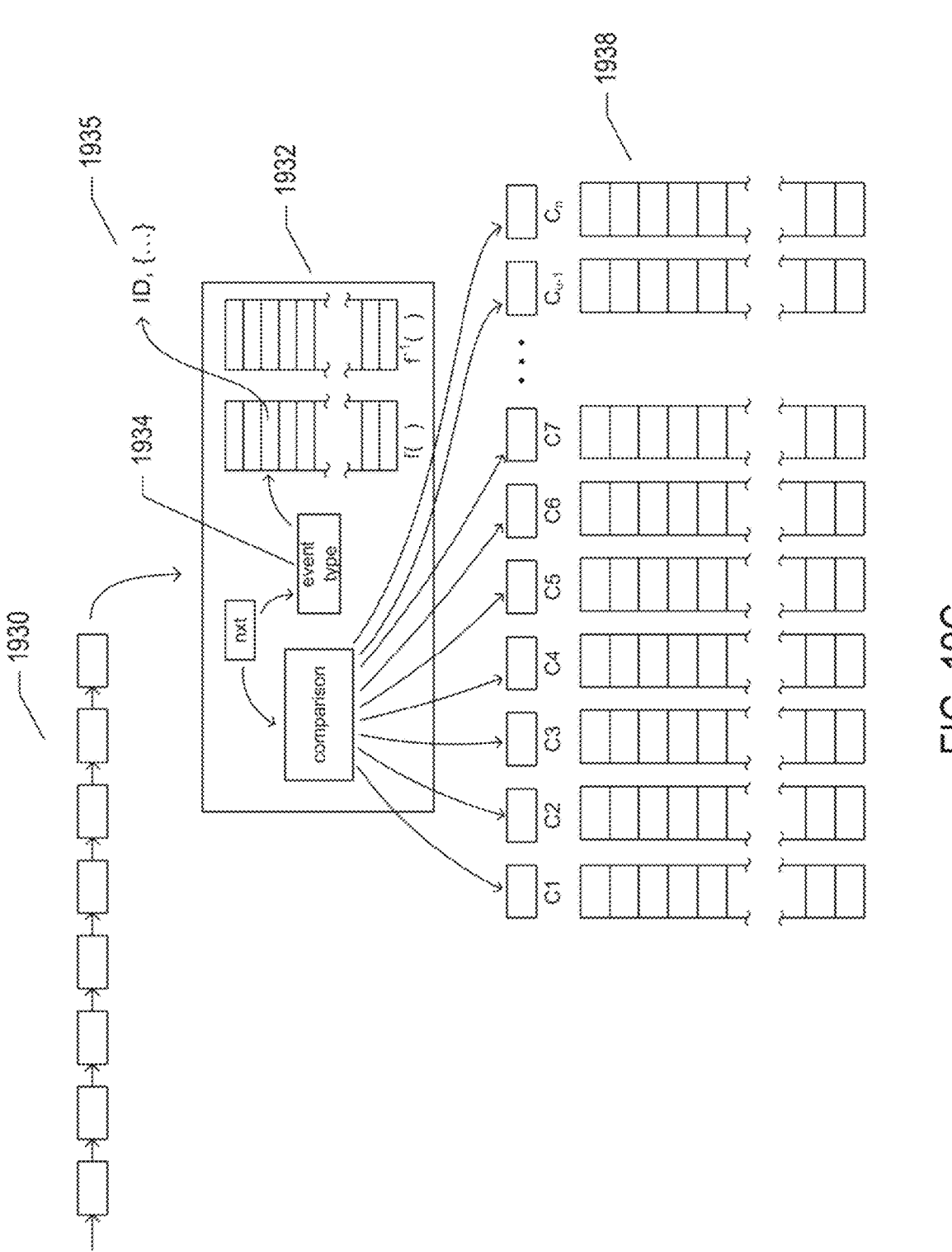

FIGS. 19A-C illustrate a clustering technique for generating an event_type( ) function and extraction and message-restoration functions $f(\ )$ and $f^1(\ )$. As shown in FIG. 19A, incoming log/event messages 1902 are input sequentially to a clustering system 1904. Each message 1906 is compared, by a comparison function 1908, to prototype messages representative of all of the currently determined clusters 1910. Of course, initially, the very first log/event message becomes the prototype message for a first cluster. A best comparison metric and the associated cluster are selected from the comparison metrics 1912 generated by the comparison function 1914. An example shown in FIG. 19A, the best comparison metric is the metric with the lowest numerical value. In this case, when the best comparison metric is a value less than a threshold value, the log/event message 1906 is assigned to the cluster associated with the best comparison metric 1916. Otherwise, the log/event message is associated with the new cluster 1918. As shown in FIG. 19B, this process continues until there are sufficient number of log/event messages associated with each of the different determined clusters, and often until the rate of new-cluster identification falls below a threshold value, at which point the clustered log/event messages are used to generate sets of extraction and message-restoration functions $f(\ )$ and $f^1(\ )$ 1920. Thereafter, as shown in FIG. 19C, as new log/event messages 1930 are received, the fully functional clustering system 1932 generates the event-type/variable-portion-list expressions for the newly received log/event messages 1934-1935 using the current event_type( ) function and sets of extraction and message-restoration functions $f(\ )$ and $f^1($ ), but also continues to cluster a sampling of newly received log/event messages 1938 in order to dynamically maintain and evolve the set of clusters, the event_type( ) function, and the sets of extraction and message-restoration functions $f(\ )$ and $f^1(\ )$.

Figure 20A:
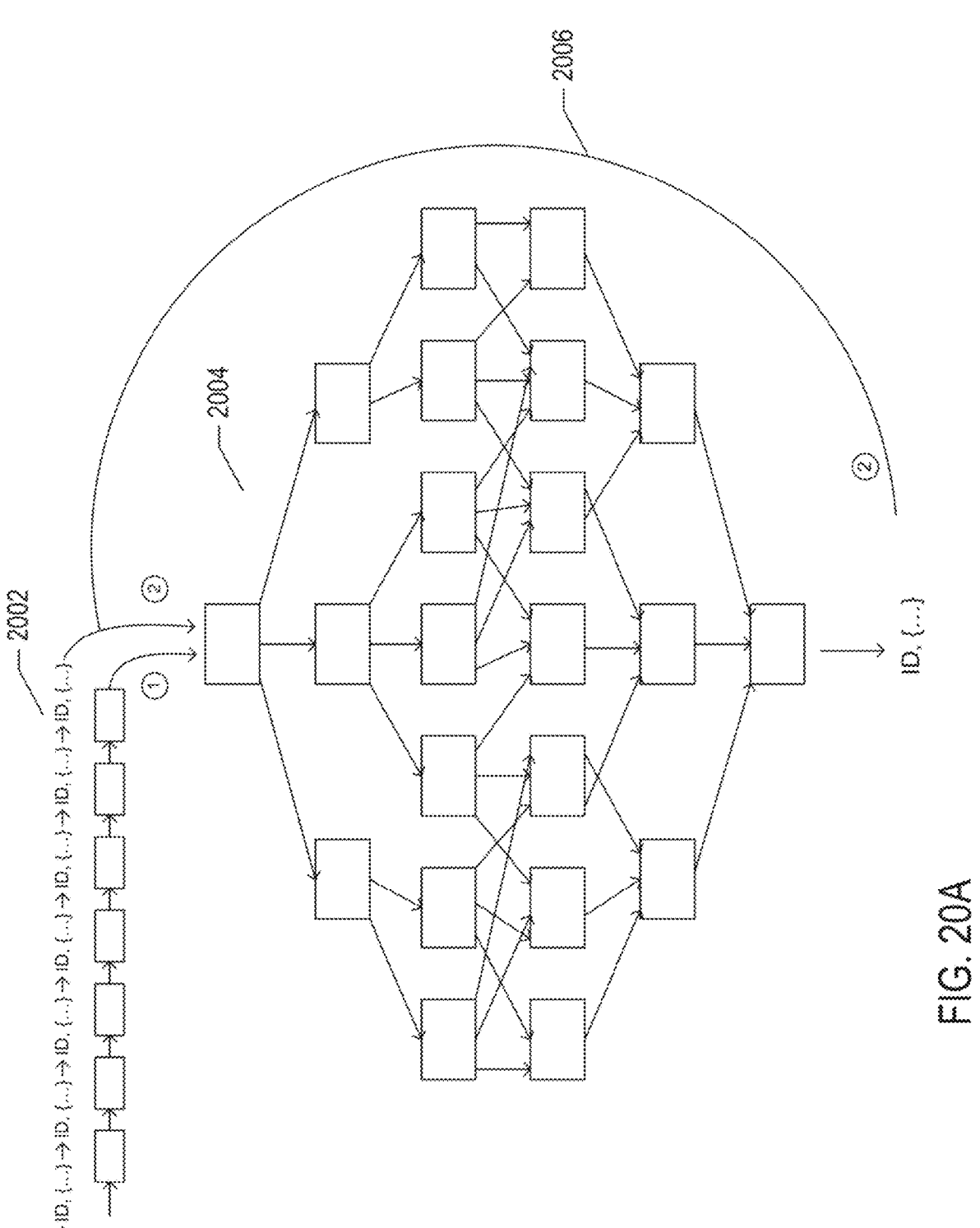
FIGS. 20A-B C illustrate a machine-learning technique for generating an event_type( ) function and extraction and message-restoration functions $f( )$ and $f^1( )$.
Figure 20B:
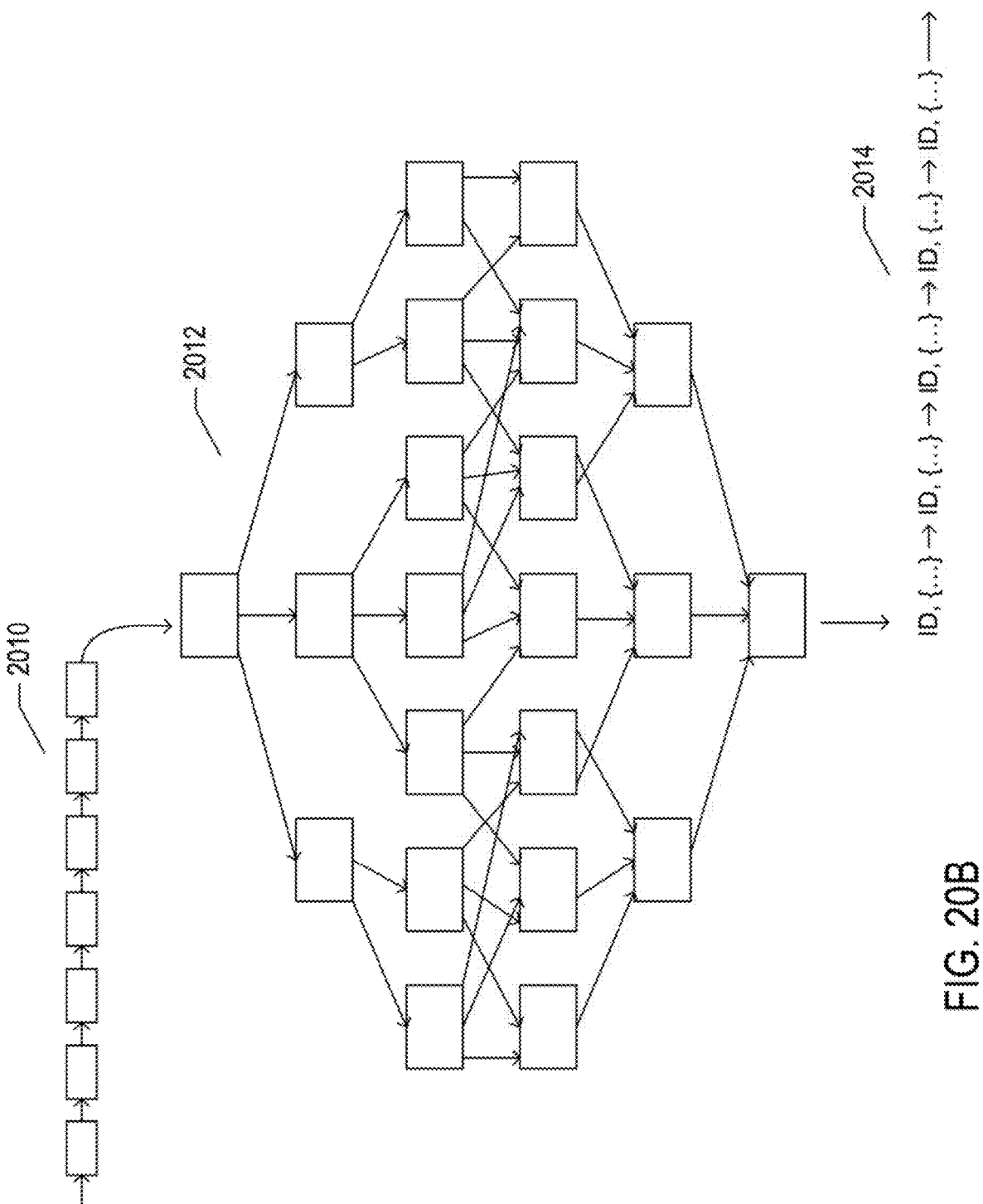

FIGS. 20A-B C illustrate a machine-learning technique for implementing an event_type( ) function and extraction and message-restoration functions $f(\ )$ and $f^1(\ )$. As shown in FIG. 20A, a training data set of log/event messages and corresponding compressed expressions 2002 is fed into a neural network 2004, which is modified by feedback from the output produced by the neural network 2006. The feedback-induced modifications include changing weights associated with neural-network nodes and can include the addition or removal of neural-network nodes and neural-network-node levels. As shown in FIG. 20B, once the neural network is trained, received log/event messages 2010 are fed into the trained neural network 2012 to produce corresponding compressed-message expressions 2014. Additionally, a different neural network may receive compressed-message expressions and output corresponding log/event messages. As with the above-discuss clustering method, the neural network can be continuously improved through feedback-induced neural-network-node-weight adjustments as well as, in some cases, topological adjustments.

Figure 21:
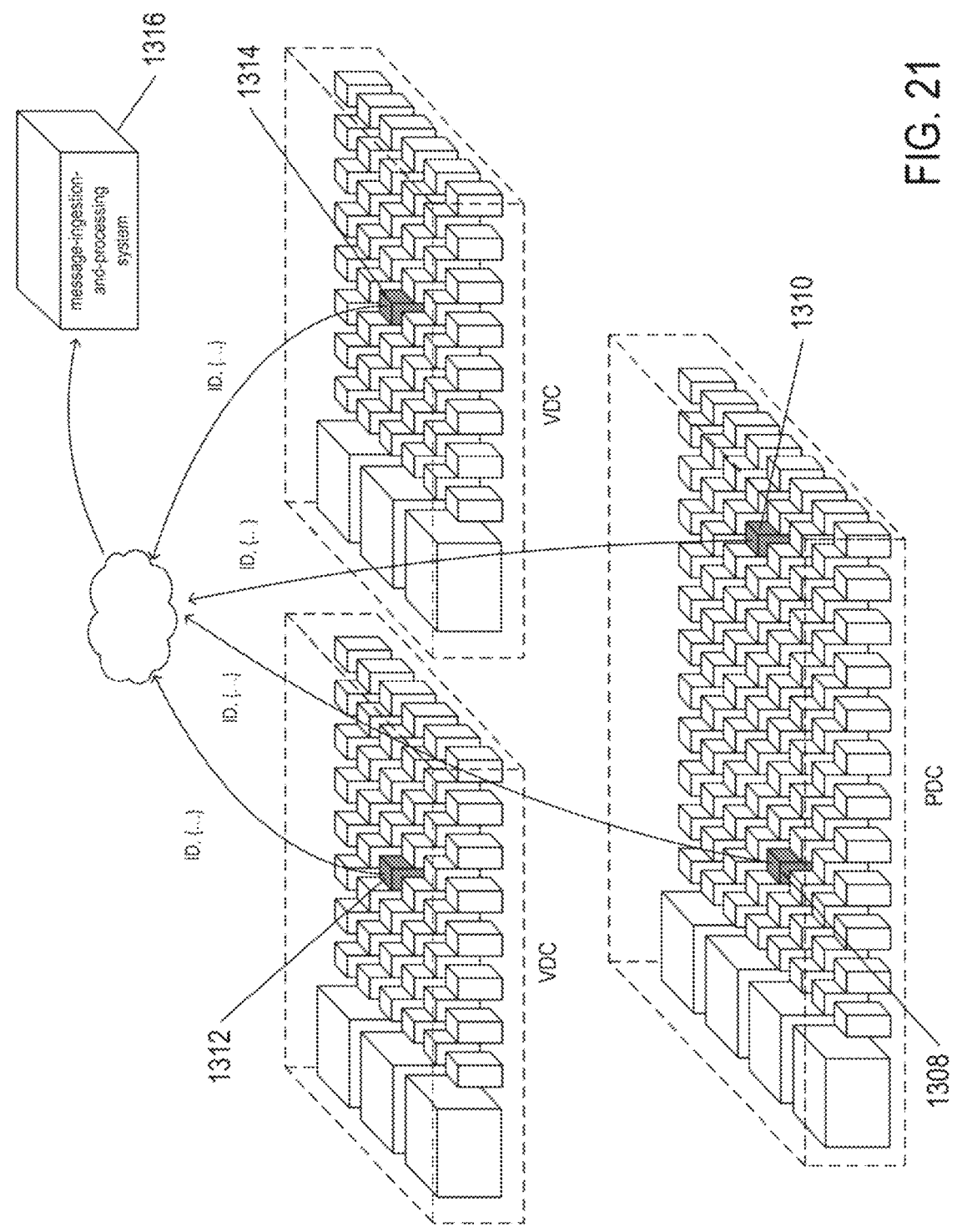
FIG. 21 illustrates a basis for the many different improvements in log/event-message collection, processing, storing, and subsequent access via queries, discussed in the current document.

FIG. 21 illustrates a basis for the many different improvements in log/event-message collection, processing, storing, and subsequent access via queries, discussed in the current document. FIG. 21 illustrates a distributed computer system that collects and transmits log/event messages to a message-ingestion-and-processing system using the same illustration conventions as used in FIG. 13A. The basis for improvement also applies to the scenario illustrated in FIG. 13B. In the improved log/event-message systems, discussed below, the message collectors 1308, 1310, 1312, and 1314 compress received log/event messages into corresponding event-type/variable-portion expressions, as discussed above with reference to FIG. 18A. As a result, the volume of data transmitted from the message collectors to the message-ingestion-and-processing system 1316 is greatly reduced, often by a factor of 10, 20, or more. The reduction in the volume of data transmitted from the message collectors frees up a significant portion of the available computational bandwidth available to the message collectors for locally carrying out additional tasks, including message filtering, message forwarding, and alert generation, and by carrying out these tasks locally, even greater reductions in the volume of data transmitted from the message collectors is obtained. The reduction in the volume of log/event-message data also reduces the computational burden on the message-ingestion-and-processing systems and on the log/event-message query system, greatly increasing the overall computational, networking, and data-storage efficiencies of the entire log/event-message system, as further explained below.

Figure 22:
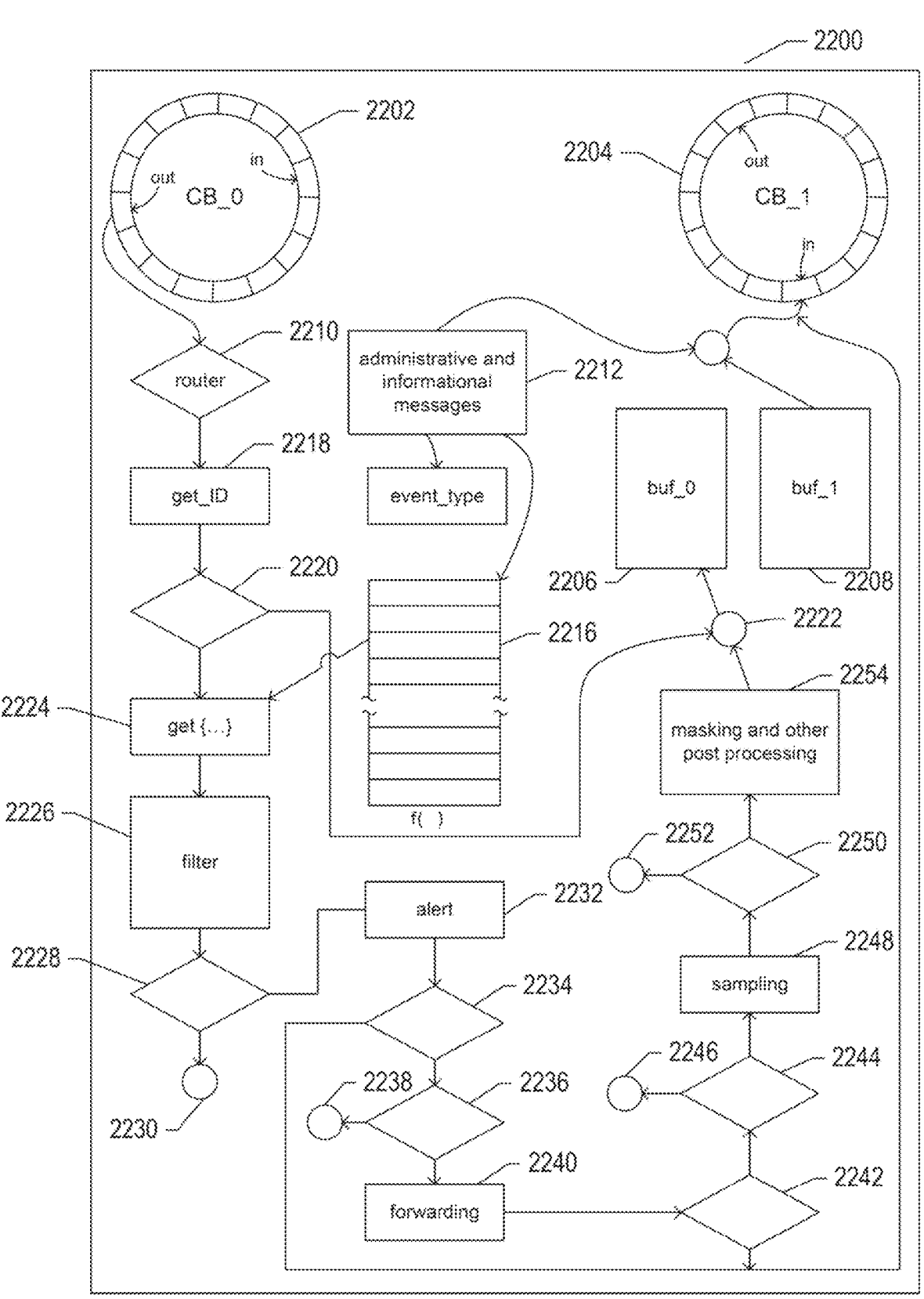
FIG. 22 illustrates an improved message collector based on local compression of log/event messages to compressed-message expressions that include an event type, or ID, and a list of numeric and/or character-string values.

FIG. 22 illustrates an improved message collector based on local compression of log/event messages to compressed-message expressions that include an event type, or ID, and a list of numeric and/or character-string values. The improved message collector 2200 includes a first input circular buffer 2202, CB_0, and a second output circular buffer, CB_1, 2204. This improved implementation uses the same notational conventions for the circular buffers, internal buffers buf_0 2206 and buf_1 2208, buffer pointers in_buf and out_buf, and local variables storing the states of the internal buffers in_buf_state and out_buf_state as used in the illustration of the generalized, currently available message collector provided in FIGS. 15-16B. Incoming messages are dequeued from the CB_0 circular queue and input to a router component 2210. Non-log/event messages are forwarded by the router component to a processing component 2212 that processes administrative and informational messages. The improved message collector forwards responses to these messages to output circular queue CB_1. In addition, when such messages contain updates of the locally cached event_type( ) function and the set of extraction functions ƒ( ), those updates are applied to the locally cached event_type( ) function 2214 and set of extraction functions ƒ( ) 2216. Log/event messages are forwarded to a first processing component 2218 which applies the locally cached event_type( ) function 2214 to each incoming log/event message in order to generate the ID for the log/event message. When the locally cached event_type( ) function fails to provide an ID for the log/event message, a second router component 2220 forwards the message to switch component 2222 for storage in the internal buffer currently pointed to by buffer pointer in_buf. Otherwise, a second processing component 2224 uses the extraction function associated with the ID to generate the list of numeric and/or character-string values corresponding to the log/event message. This list, along with the ID, together comprise the compressed-message expression. The compressed-message expression is then input to a filtering component 2226 which applies 0, 1, or more filter functions and/or rules to the compressed-message expression. The filter functions or rules may remove items from the list of numerical and/or character-string values, change items in the list of numerical and/or character-string values, add, in rare cases, items to the list of numerical and/or character-string values, and/or return indications that the message should be dropped altogether. The output of the filtering component is input to a third router component 2228 which may drop the compressed-message expression 2230, if so indicated by the filtering component, or forward the possibly altered compressed-message expression to an alert component 2232. The alert component applies 0, 1, or more alert functions and/or rules to the compressed-message expression to produce an output that is forwarded to a fourth router component 2234. When the output from the alert component indicates that one or more alert messages are to be output by the message collector, those messages are forwarded to the output circular queue CB_1. The output from the alert component is then forwarded to a fifth routing component 2236, which may either drop the output compressed-message expression 2238 or forward the compressed-message expression 2238 or forward the compressed-message expression to a forwarding component 2240. The forwarding component applies 0, 1, or more forwarding functions or rules to the compressed-message expression to produce an output that is forwarded to a sixth routing component 2242. When the output from the forwarding component indicates that the compressed-message expression should be forwarded one or more remote entities, corresponding messages containing the compressed-message expression are forwarded to the output circular queue CB_1. The output from the forwarding component is then forwarded to a seventh routing component 2244 which may either drop the output compressed-message expression 2246 or forward the compressed-message expression to a sampling component 2248. The sampling component 2248 determines whether the event type of the compressed-message expression is an event type for which sampling has been configured. If so, the sampling component determines whether the current compressed-message expression should be transmitted to the message-ingestion-and-processing system or dropped. An eighth routing component 2250 either drops the output compressed-message expression 2252 or forwards the compressed-message expression to a masking and post-processing component 2254. The masking in post-processing component may mask one or more numerical and/or character-string items in the compressed-message-expression list and may carry out additional types of transformations of the compressed-message expression before outputting the compressed-message expression to the internal buffer referenced by the buffer pointer in_buf for transmission to the message-ingestion-and-processing system.

The improved message collector is therefore more complex and carries out many additional tasks than the message collector previously discussed with reference to FIGS. 15-16B. The improved message collector can drop messages identified for termination at the message-collector level by filtering functions and rules, sampling functions and rules, and by alert function and rules. Every log/event message dropped at the message-collector level decreases networking overheads and computational overheads associated with both the message collector and the message-ingestion-and-processing system. In certain implementations, the buffered compressed-message expressions can be further compressed by any of various general compression techniques. However, the compression of messages to generate the above-described compressed-message expressions removes much of the redundant information from log/event messages, as a result of which additional application of general compression methods may provide insufficient additional compression benefits to justify the computational overhead. The large compression ratios achieved by the above-described methods can reduce the volume of the data transmitted from the message collector to the message-ingestion-and-processing system by an order of magnitude or more, and this reduction translates into increased computational bandwidth that allows for the various filtering, alert-generation, forwarding, sampling, masking, and other post-processing functions carried out by the improved message collector. Generation of alerts and forwarding messages at the message-collector level saves the unnecessary network overheads needed to first send the messages to the message-ingestion-and-processing system and reduces the computational overheads at the message-ingestion-and-processing system.

Figure 23A:
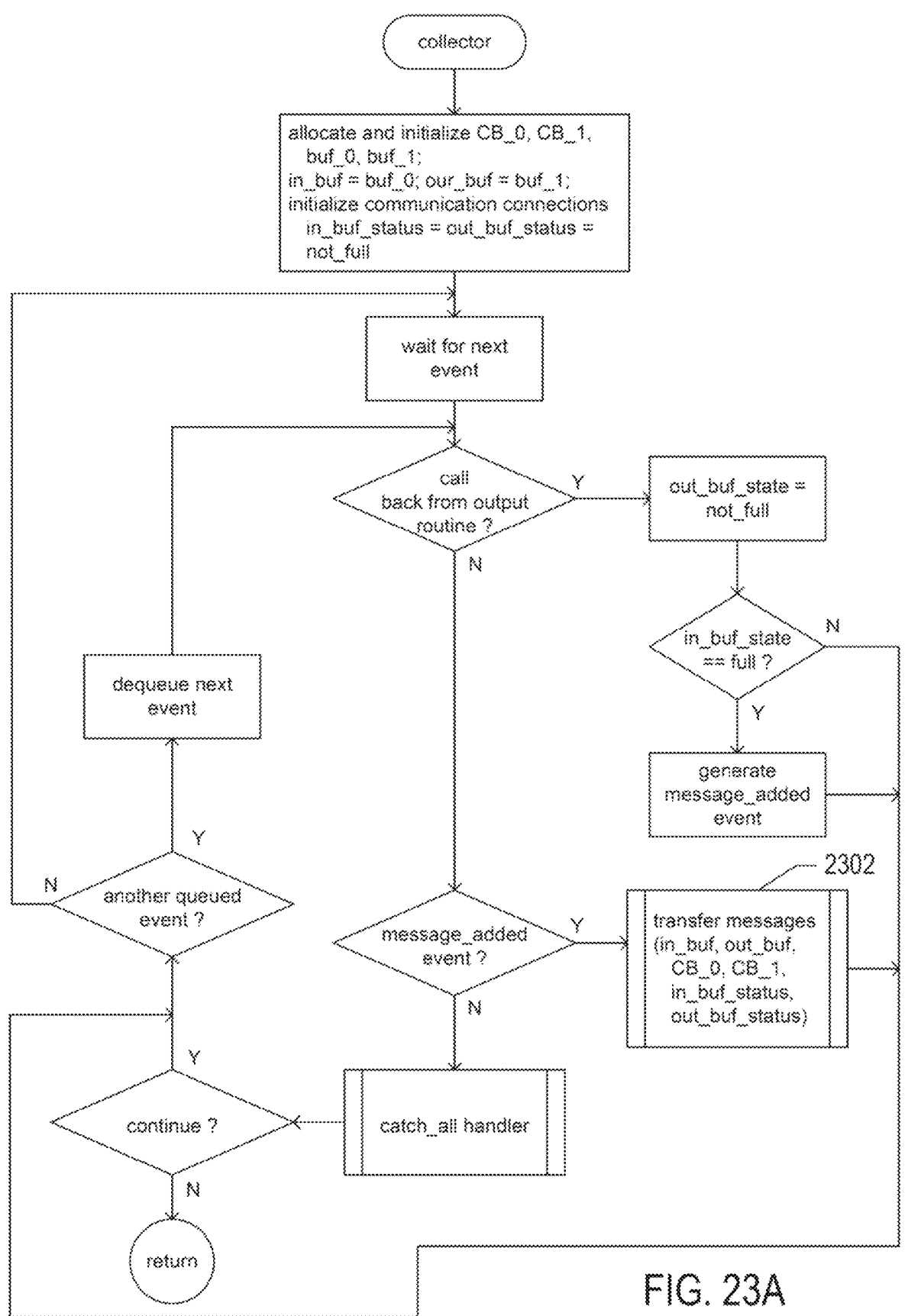
FIGS. 23A-D provide control-flow diagrams that illustrate a logical implementation of the improved message collector.

FIGS. 23A-D provide control-flow diagrams that illustrate a logical implementation of the improved message collector. Many of the steps in these control-flow diagrams are identical or very similar to previously described steps in FIGS. 16A-B, and will not therefore be redundantly described below. FIG. 23A provides a control-flow diagram for the underlying event loop, similar to the event loop illustrated in FIG. 16A. In fact, the event loop in the improved message collector is somewhat simpler. There is, for example, no need to detect callbacks from the encryption routine, since the messages stored in the internal buffers are not encrypted in the described implementation.

Figure 23B:
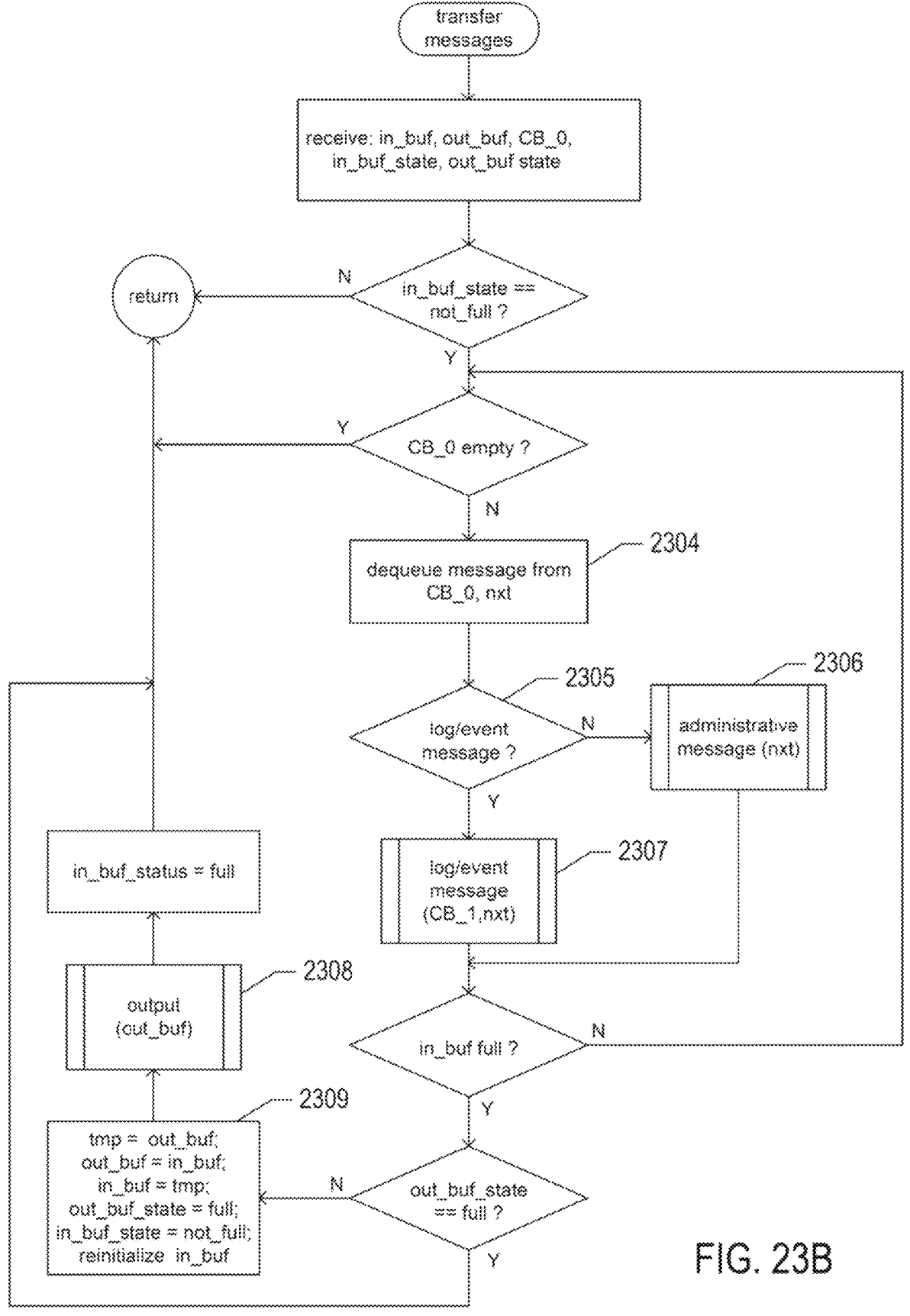

FIG. 23B provides a control-flow diagram for the routine transfer messages, called in step 2302 of FIG. 23A. Many of the steps in this routine are identical or similar to steps in the transfer messages routine shown in FIG. 16B. However, the single step 1648 in FIG. 16B is replaced, in the routine transfer messages of FIG. 23B, with the four steps 2304-2307. In step 2304, a next message is dequeued from circular buffer CB_0 as message nxt. In step 2305, the routine transfer messages determines whether the message nxt is a log/event message. If not, then the routine administrative message is called, in step 2306, to handle the message. These types of messages include messages with information to update the locally cached event_type( ) function and set of extraction functions (2214 and 2216 in FIG. 22). Otherwise, a routine log/event message is called to handle the message nxt in step 2307. An additional change in the new routine transfer messages, shown in FIG. 23B, is that the function output is called, in step 2308, rather than the function encrypt, called in step 1656 of FIG. 16B. A final change is that the local variables in_buf_state and out_buf_state are set to not_full and full, in step 2309, rather than the values to which they are set in step 1654 of FIG. 16B.

Figure 23C:
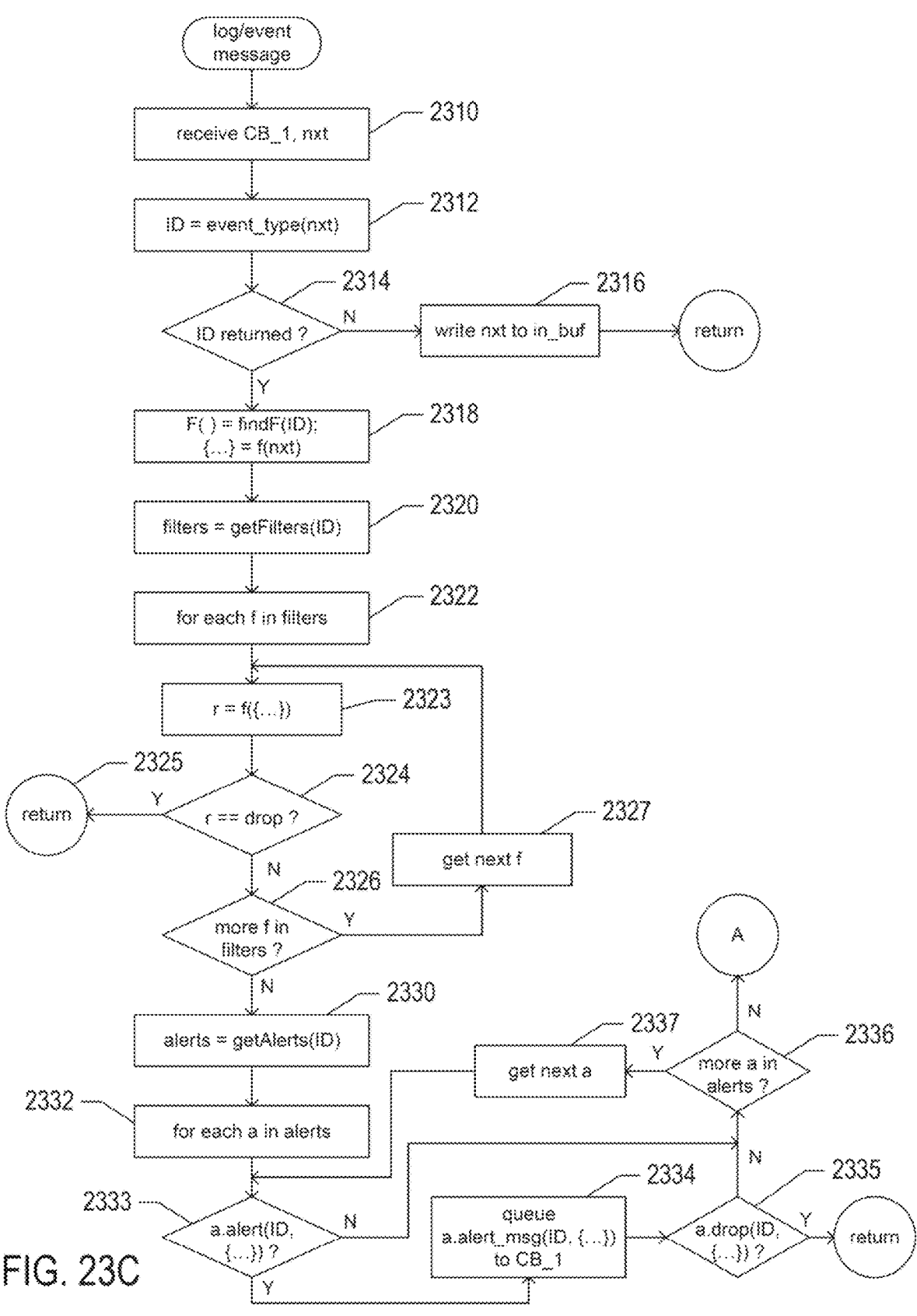
Figure 23D:
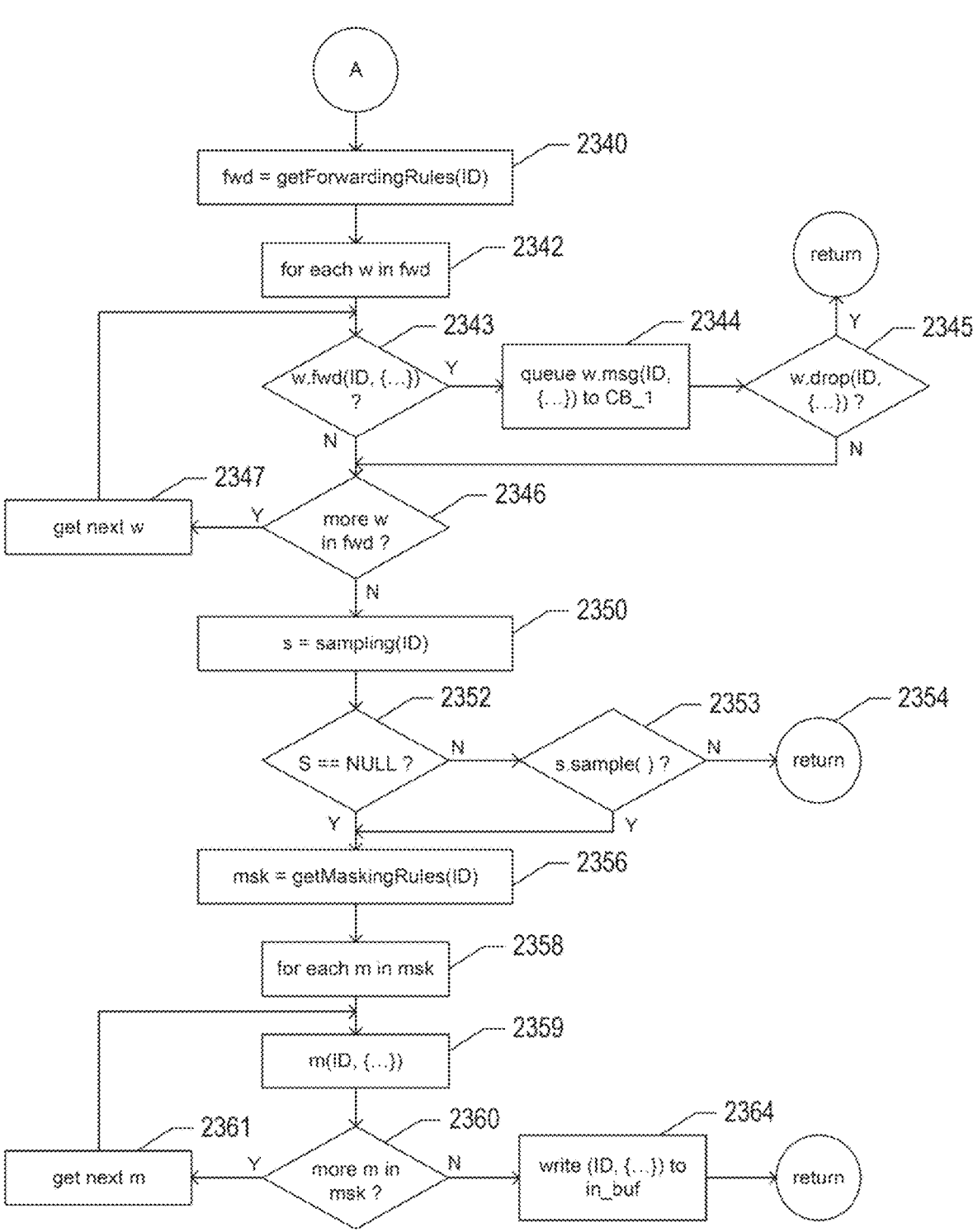

FIGS. 23C-D provide control-flow diagrams for the routine log/event message, called in step 2307 of FIG. 23B. In step 2310, the routine log/event message receives a reference to the output circular queue CB_1 and to the log/event message nxt. In step 2312, the ID for log/event message nxt is obtained by calling the locally cached event_type( ) function. When the function event_type( ) fails to return an ID, as determined in step 2314, the log/event message nxt is written to the internal buffer referenced by in_buf, in step 2316, and the routine log/event message then returns. Otherwise, in step 2318, the list of numerical and/or character-string values for the compressed-message expression is obtained by calling the appropriate extraction function selected from the set of locally cached extraction functions. In step 2320, the local set variable filters is set to the filter rules or functions associated with the event type ID. In the for-loop of steps 2322-2327, each filter or rule is applied to the compressed-message expression and, if application of a rule or function indicates that the message should be dropped, the routine log/event message terminates, in step 2325. Various types of filter functions and rules alter the list of numerical and/or character-string values in the compressed-message expression, as discussed above. In step 2330, the local variable alerts is set to the alert rules and functions associated with event type ID. In the for-loop of steps 2332-2337, alert rules and/or functions are iteratively applied to the compressed-message expression. If a rule or function indicates that an alert should be sent, the alert message is queued to the output queue CB_1, in step 2334. If the rule or function also indicates that, following setting of the alert message, the compressed-message expression should be dropped, as determined in step 2335, then the routine log/event message terminates. Turning to FIG. 23D, in step 2340, the routine log/event message sets the local set variable fwd to the forwarding rules and/or functions associated with the event type ID. In the for-loop of steps 2342-2347, the forwarding rules and/or functions are iteratively applied to the compressed-message expression. When application of a rule or function indicates that the compressed-message expression should be forwarded to a remote computing entity, a message containing the compressed-message expression is queued to the output circular buffer CB_1, in step 2344. The rule or function indicates that the compressed-message expression should be dropped, following forwarding to the remote computing entity, as determined in step 2345, the routine log/event message terminates. In step 2350, the routine log/event message sets the local function-pointer variable s to the sampling function for event type ID. If s is not a null pointer, as determined in step 2352, and if the sampling function indicates that the compressed-message expression should be dropped, as determined in step 2353, the routine log/event message terminates, in step 2354. In step 2356, routine log/event message sets the local variable msk to the masking and other post-processing rules and/or functions associated with event type ID. Then, in the for-loop of steps 2358-2361, those rules and/or functions are applied to the compressed-message expression. Finally, in step 2364, the compressed-message expression is written to the internal buffer referenced by the buffer pointer in_buf.

In different implementations, the sequence of compressed-message-expression processing functions applied by message collectors the compressed-message expression may differ from the sequence of processing functions shown in the example message collector of FIGS. 22 and 23A-D. For example, the masking function may be performed prior to the forwarding function, or may be optionally performed prior to forwarding, so that masked compressed message expressions are forwarded. Additional processing functions may be included in alternative implementations, certain of the above-described processing functions may be omitted in other implementations, and the functions themselves may have a variety of different implementations.

The various filtering, forwarding, alert-generation, sampling, masking, and post-processing functions carried out by the improved message collector are far more efficient when applied to compressed-message expressions than when applied to log/event messages. In the latter case, computationally expensive parsing and disambiguation functions are often needed to identify the portions of the log/event messages relevant to application of the filtering, forwarding, alert-generation, sampling, masking, and post-processing functions. Thus, not only do compressed-message expressions result in a decrease in computational overheads due do data compression, but also increase the efficiency with which additional computational tasks can be carried out by the improved message collector.

Figure 24:
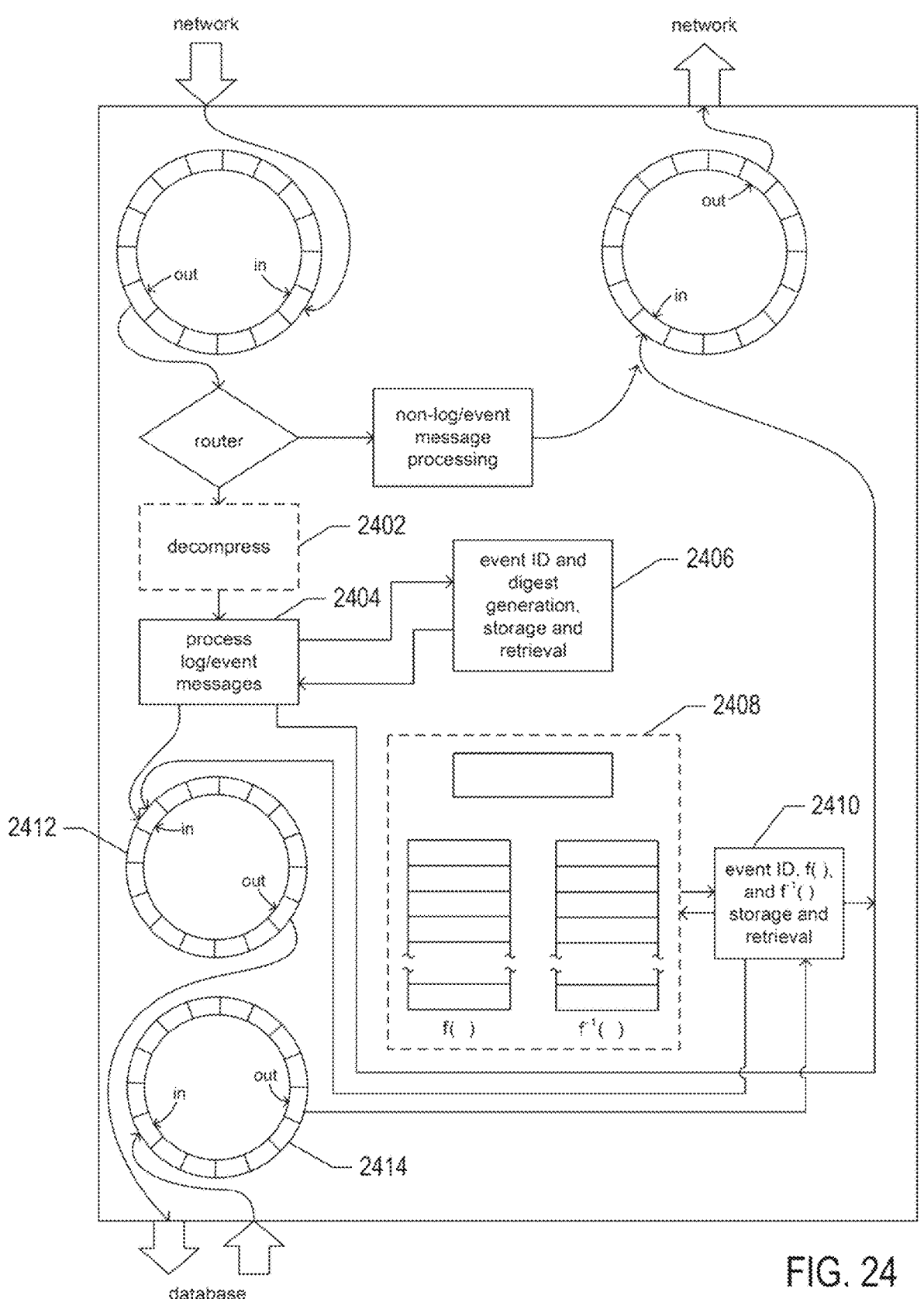
FIG. 24 shows a logical implementation of the improved message-ingestion-and-processing system.

FIG. 24 shows a logical implementation of the improved message-ingestion-and-processing system. Many of the components in the improved message-digestion-and-processing system are identical or similar to components in the message-ingestion-and-processing system shown in FIG. 17, and will not be redundantly described below. The decompression component 2402, for example, is optional, and only present in the case that generalized compression is used by the message collectors in addition to compression to the ID and list of numerical and/or character-string values. The log/event message processing component 2404 forwards any uncompressed log/event messages to the event-ID-and-digest-generation-storage-and-retrieval component 2406, which returns a compressed-message expression for the log/event message. This component, in addition, continues to update the locally cached event_type( ) function, set of extraction functions, and set of message-restoration functions 2408. As the locally cached event_type( ) function, set of extraction functions, and set of message-restoration functions 2408 evolve, updates are generated by component 2410 and transported to the database to update the persistently stored event_type( ) function, set of extraction functions, and set of message-restoration functions. Updates generated by component 2410 are also sent, in update messages, to the message collectors for the messages collectors to update their event_type( ) function, set of extraction functions, and set of message-restoration functions caches. In alternate implementations, updates may be provided to the message collectors from the message database. In addition, the locally cached event_type( ) function, set of extraction functions, and set of message-restoration functions 2408 can be initialized by information retrieved from the database on power-up or restart of the improved message-ingestion-and-processing system. In the improved message-ingestion-and-processing system, there is both an output circular queue 2412 and an input circular queue 2414 for transmission of compressed-message expressions and updates to the event_type( ) function, set of extraction functions, and set of message-restoration functions stored in the database and for retrieval of the event_type( ) function, set of extraction functions, and set of message-restoration functions stored in the database. Because compressed-message expressions are stored in the message database, rather than entire log/event messages, the storage-capacity overhead is greatly reduced, along with reduction of the computational overheads and data-transmission overheads associating transmission of data to the message database. Of course, many additional types of message processing may be carried out by particular message-ingestion-and-processing-system implementations.

Figure 25:
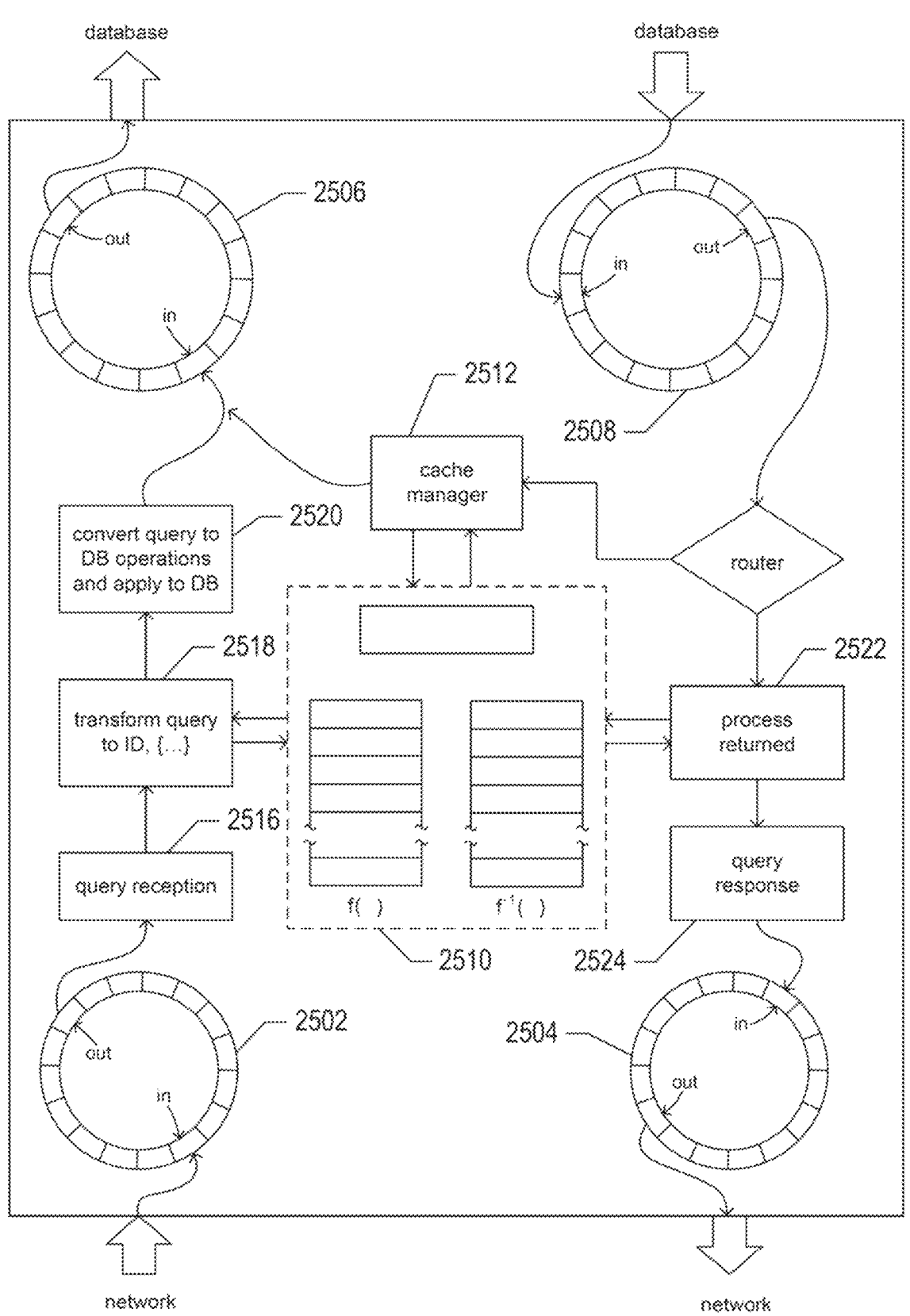
FIG. 25 shows a logical implementation of the log/event message query system.

FIG. 25 shows a logical implementation of the log/event message query system. This system has input and output circular queues 2502 and 2504 for receiving and sending messages to the network as well as output and input circular queues 2506 and 2508 for sending queries to, and receiving query responses from, the message database. Like the message-ingestion-and-processing system, discussed above with reference to FIG. 24, the log/event message query system maintains a local cache of the event_type( ) function, extraction functions and message-restoration functions 2510, managed by a cache manager 2512. The event_type( ) function, extraction functions and message-restoration functions are persistently stored in the message database. Incoming queries are processed by a query-reception component 2516, transformed to queries directed to compressed-message expressions by component 2518, using the local cache of the event type( ) function, extraction functions and message-restoration functions 2510 to carry out the transformations, and are further processed to generate database queries by component 2520. Responses from the database are processed by a response-processing component 2522 and forwarded to a query-response component 2524, which prepares and outputs query responses to the remote computational entities from which the associated query is received. Because the message database stores compressed-message expressions, generation of database queries 2520 is significantly simpler and, because of the great reduction in data stored in the message database, even complex queries involving multiple join operations are generally much more efficiently and quickly processed by the message database, as a result of which responses are returned with significantly smaller latencies than in the above-described, currently available event/log-message systems.

The present invention has been described in terms of particular embodiments, it is not intended that the invention be limited to these embodiments. Modifications within the spirit of the invention will be apparent to those skilled in the art. For example, any of many different implementations of the log/event-message system can be obtained by varying various design and implementation parameters, including modular organization, control structures, data structures, hardware, operating system, and virtualization layers, and other such design and implementation parameters. The message database may be implemented using any of a variety of different types of currently available database management systems, including a variety of different types of relational database management systems. Logical implementations for the message collector, message-ingestion-and-processing system, and log/event-message query system are provided in FIGS. 22, 24, and 25. There are, of course, a wide variety of different types of real-world implementations corresponding to these logical implementations and, in addition, there are many alternative logical implementations for these log/event-message-system components. Information may be exchanged between message collectors, message-ingestion-and-processing systems, and message databases by polling for information from information sources or by pushing information by information sources. Message collectors, message-ingestion-and-processing systems, and message databases may run on single computer systems or may be distributed across multiple computer systems. Message collectors may transmit compressed-message expressions to multiple message-ingestion-and-processing systems, message-ingestion-and-processing systems may receive compressed-message expressions from multiple message collectors, and compressed-message expressions may be stored in multiple message databases. A log/event-message system generally includes multiple message collectors, fewer message-ingestion-and-processing systems, and one or several message databases. Many log/event-message systems include multiple message collectors, one message-ingestion-and-processing system, and one message database.

What is claimed is:

1. An improved log/event-message system, within a distributed computer system, that collects log/event messages from log/event-message sources within the distributed computer system, stores the collected log/event messages, and provides query-based access to the stored log/event-messages, the log/event-message system comprising:

one or more message collectors, incorporated within one or more computer systems, each having one or more processors and one or more memories, which each
        receives log/event messages,
        compresses the received log/event messages into compressed-message expressions, and
        forwards the compressed-message expressions to one or more of one or more message-ingestion-and-processing systems; and the one or more message-ingestion-and-processing systems, incorporated within one or more computer systems, each having one or more processors and one or more memories, which each
        receives compressed-message expressions from one or more of the one or more message collectors, and
        stores the received compressed-message expressions in a message database.

2. The log/event-message system of claim 1 wherein log/event-message sources include:

message-generation-and-reporting components of hardware components of the distributed computer system, including network routers and bridges, network-attached storage devices, and network-interface controllers; and message-generation-and-reporting components within computer-instruction-implemented components of the distributed computer system, including virtualization layers, operating systems, and applications.

3. The log/event-message system of claim 1 wherein log/event-messages include text, alphanumeric values, and/or numeric values that represent various types of information, including notification of completed actions, errors, anomalous operating behaviors and conditions, and various types of computational events and warnings.

4. The log/event-message system of claim 1 wherein the compressed-message expression corresponding to a log/event message includes numeric and/or character-string values corresponding to variable portions of the type of log/event message to which the log/event message belongs.

5. The log/event-message system of claim 1 wherein the message collector compresses a received log/event message into a compressed-message expression by applying a first function to the received log/event message to generate an event type for the received log/event message;

using the event type to select an extraction function for the event type;

applying the extraction function to generate a list of 0, 1, or more numeric and/or character-string values; and combining the event type and list to generate the compressed-message expression.

6. The log/event-message system of claim 5 wherein the first and extraction functions are:

manually created from templates;

automatically generated by a clustering method; and/or implemented by a machine-learning system.

7. The log/event-message system of claim 5 wherein the message collector, after compressing a received log/event message into a compressed-message expression, processes the compressed-message expression by one or more compressed-message-expression processes selected from among:

a filtering process;

an alert process;

a forwarding process;

a sampling process; and a masking process.

8. The log/event-message system of claim 7 wherein the filtering process receives a compressed-message expression;

applies one or more filtering functions and/or rules to the received compressed-message expression or to a modified version of the compressed-message expression, each filtering function and rule either modifying the list or indicating that the received compressed-message expression should be dropped; and when one of the applied functions or rules indicates that the received compressed-message expression should be dropped, terminates processing of the received compressed-message expression by the message collector, preventing forwarding of the received compressed-message expression to the one or more of one or more message-ingestion-and-processing systems by the message collector.

9. The log event-message system of claim 7 wherein the alert process receives a compressed-message expression;

applies one or more alert functions and/or rules to the received compressed-message expression, each alert function and rule indicating whether an alert should be generated and, if an alert should be generated, whether the received compressed-message expression should be dropped;

when one of the applied functions or rules indicates that an alert should be generated, generates the alert and forwards the alert for transmission; and when one of the applied functions or rules indicates that the received compressed-message expression should be dropped, terminates processing of the received compressed-message expression by the message collector, preventing forwarding of the received compressed-message expression to the one or more of one or more message-ingestion-and-processing systems by the message collector.

10. The log/event-message system of claim 7 wherein the forwarding process receives a compressed-message expression;

applies one or more forwarding functions and/or rules to the received compressed-message expression, each forwarding function and rule indicating whether the received compressed-message expression should be forwarded to a remote computing entity other than one or more of one or more message-ingestion-and-processing systems and, if the received compressed-message expression should be forwarded, whether the received compressed-message expression should be dropped;

when one of the applied functions or rules indicates that received compressed-message expression should be forwarded to a remote computing entity other than one or more of one or more message-ingestion-and-processing systems, forwards the received compressed-message expression for transmission to the remote computing entity; and when one of the applied functions or rules indicates that the received compressed-message expression should be dropped, terminates processing of the received compressed-message expression by the message collector, preventing forwarding of the received compressed-message expression to the one or more of one or more message-ingestion-and-processing systems by the message collector.

11. The log event-message system of claim 7 wherein the sampling process receives a compressed-message expression;

determines whether the event type included in received compressed-message expression is currently being sampled;

when the event type included in received compressed-message expression is currently being sampled, determines whether the received compressed-message expression should be dropped, and when one of the applied functions or rules indicates that the received compressed-message expression should be dropped, terminates processing of the received compressed-message expression by the message collector, preventing forwarding of the received compressed-message expression to the one or more of one or more message-ingestion-and-processing systems by the message collector.

12. The log/event-message system of claim 7 wherein the masking process receives a compressed-message expression; and applies one or more masking functions and/or rules to the received compressed-message expression or to a modified version of the compressed-message expression, each masking function and rule modifying the list to conceal or obscure one or more numeric and/or character-string values in the list.

13. A method that improves a log/event-message system within a distributed computer system that collects log/event messages from log/event-message sources within the distributed computer system, stores the collected log/event messages, and provides query-based access to the stored log/event-messages, the method comprising:

collecting log/event-messages from the log/event-message sources by one or more message collectors, each message collector compressing the received log/event messages into compressed-message expressions, and forwarding the compressed-message expressions to one or more of one or more message-ingestion-and-processing systems; and receiving compressed-message expressions from one or more of the one or more message collectors by the one or more message-ingestion-and-processing systems, each message-ingestion-and-processing system storing the received compressed-message expressions in a message database.

14. The method of claim 13 wherein log/event-messages are issued by:

message-generation-and-report in functionality incorporated within hardware components of the distributed computer system, including network routers and bridges, network-attached storage devices, and network-interface controllers; and message-generation-and-reporting functionality incorporated within computer-instruction-implemented components of the distributed computer system, including virtualization layers, operating systems, and applications.

15. The method of claim 14 wherein the compressed-message expression corresponding to a log/event message includes numeric and/or character-string values corresponding to variable portions of the type of log/event message to which the log/event message belongs.

16. The method of claim 14 wherein the message collector compresses a received log/event message into a compressed-message expression by applying a first function to the received log/event message to generate an event type for the received log/event message;

using the event type to select an extraction function for the event type;

applying the extraction function to generate a list of 0, 1, or more numeric and/or character-string values; and combining the event type and list to generate the compressed-message expression.

17. The method of claim 16 wherein the first and extraction functions are:

manually created from templates;

automatically generated by a clustering method;

and/or implemented by a machine-learning system.

18. The method of claim 17 wherein the message collector, after compressing a received log/event message into a compressed-message expression, processes the compressed-message expression by one or more compressed-message-expression processes selected from among:

a filtering process;

an alert process;

a forwarding process;

a sampling process; and a masking process.

19. A physical data-storage device that stores computer instructions that, when executed by processors within computer systems of a log/event-message system within a distributed computer system, control the log/event-message system to:

collect log/event-messages from log event-message sources by one or more message collectors, each message collector compressing the received log/event messages into compressed-message expressions, and forwarding the compressed-message expressions to one or more of one or more message-ingestion-and-processing systems; and receive compressed-message expressions from one or more of the one or more message collectors by the one or more message-ingestion-and-processing systems, each message-ingestion-and-processing system storing the received compressed-message expressions in a message database.

\* \* \* \* \*